United States Patent
Tateishi et al.

(10) Patent No.: US 7,522,482 B2
(45) Date of Patent: Apr. 21, 2009

(54) OPTICAL PICKUP DEVICE AND APPARATUS FOR READING DATA FROM OPTICAL STORAGE MEDIUM

(75) Inventors: Kiyoshi Tateishi, Tsurugashima (JP);
Kazuo Takahashi, Tsurugashima (JP);
Mitsuru Sato, Tokorozawa (JP); Ichiro Sugai, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 825 days.

(21) Appl. No.: 10/921,836

(22) Filed: Aug. 20, 2004

(65) Prior Publication Data
US 2005/0041541 A1    Feb. 24, 2005

(30) Foreign Application Priority Data
Aug. 22, 2003    (JP) .............................. 2003-208378

(51) Int. Cl.
*G11B 7/00*    (2006.01)
(52) U.S. Cl. .............. 369/44.11; 369/44.25; 369/44.27; 369/44.29
(58) Field of Classification Search ........................ None
See application file for complete search history.

(56) References Cited

U.S. PATENT DOCUMENTS

| 5,835,460 A | 11/1998 | Nishikata |
| 6,246,646 B1* | 6/2001 | Abe et al. ................. 369/44.27 |
| 2001/0008506 A1* | 7/2001 | Takeya et al. ............. 369/44.29 |
| 2002/0048236 A1* | 4/2002 | Tada et al. ................ 369/44.27 |
| 2003/0012106 A1* | 1/2003 | Kobayashi ................ 369/53.23 |
| 2005/0068859 A1* | 3/2005 | Park et al. ................. 369/44.25 |

FOREIGN PATENT DOCUMENTS

| EP | 1 056 074 A2 | 11/2000 |
| EP | 1 624 452 A1 | 2/2006 |
| JP | 10-31828 A | 2/1998 |

OTHER PUBLICATIONS

EP Search Report dated Jul. 25, 2007 issued in EP Application No. 04 01 8384.

* cited by examiner

*Primary Examiner*—Wayne R Young
*Assistant Examiner*—Lixi Chow
(74) *Attorney, Agent, or Firm*—Sughrue Mion, PLLC

(57) ABSTRACT

An optical pickup is provided for preventing an objective lens from colliding with an optical recording medium at the stage of initial adjustments. The optical pickup device comprises a servo circuit, and a lens driver for driving an objective lens. In the servo circuit, a drive signal generator supplies the lens driver with one of a first focus drive signal for moving the objective lens in a direction closer to an information recording layer, and a second focus drive signal for moving the objective lens in a direction away from the information recording layer. A controller in a timing generator switches a signal supplied to the lens driver from the first focus drive signal to the second focus drive signal when the level changes by a predetermined range or more in a servo signal which is generated during a period in which the first focus drive signal is being supplied to the lens driver.

5 Claims, 23 Drawing Sheets

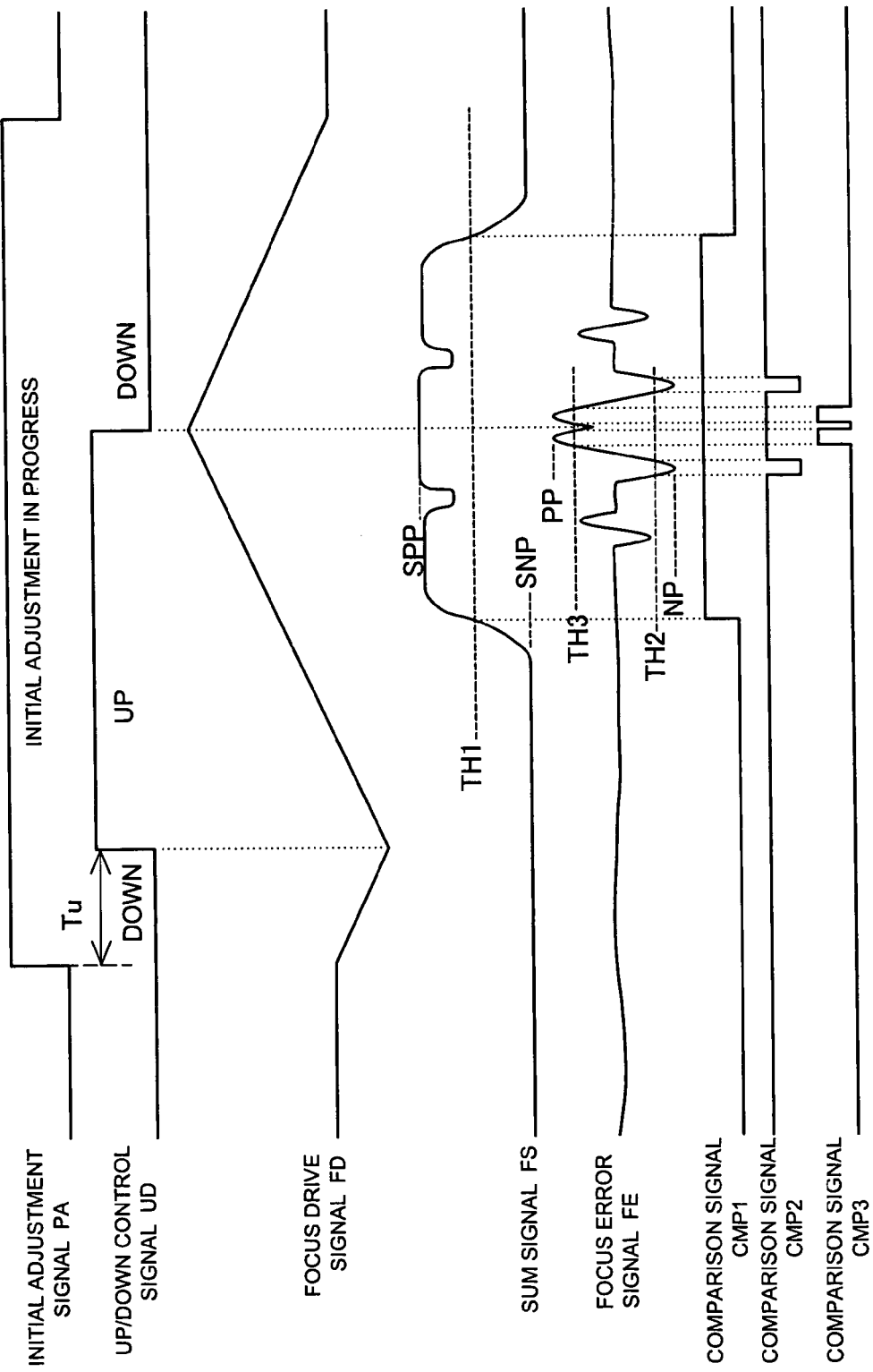

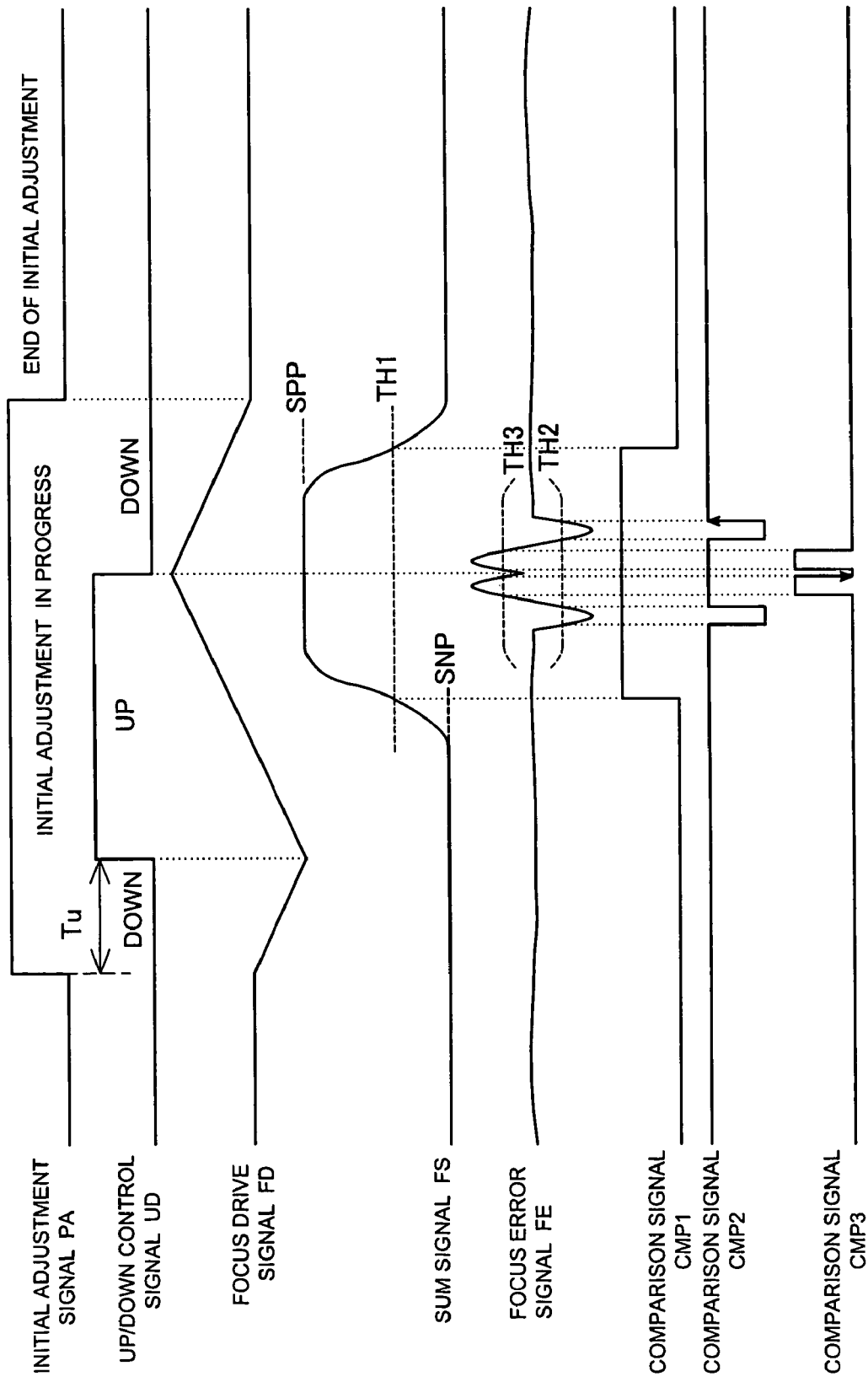

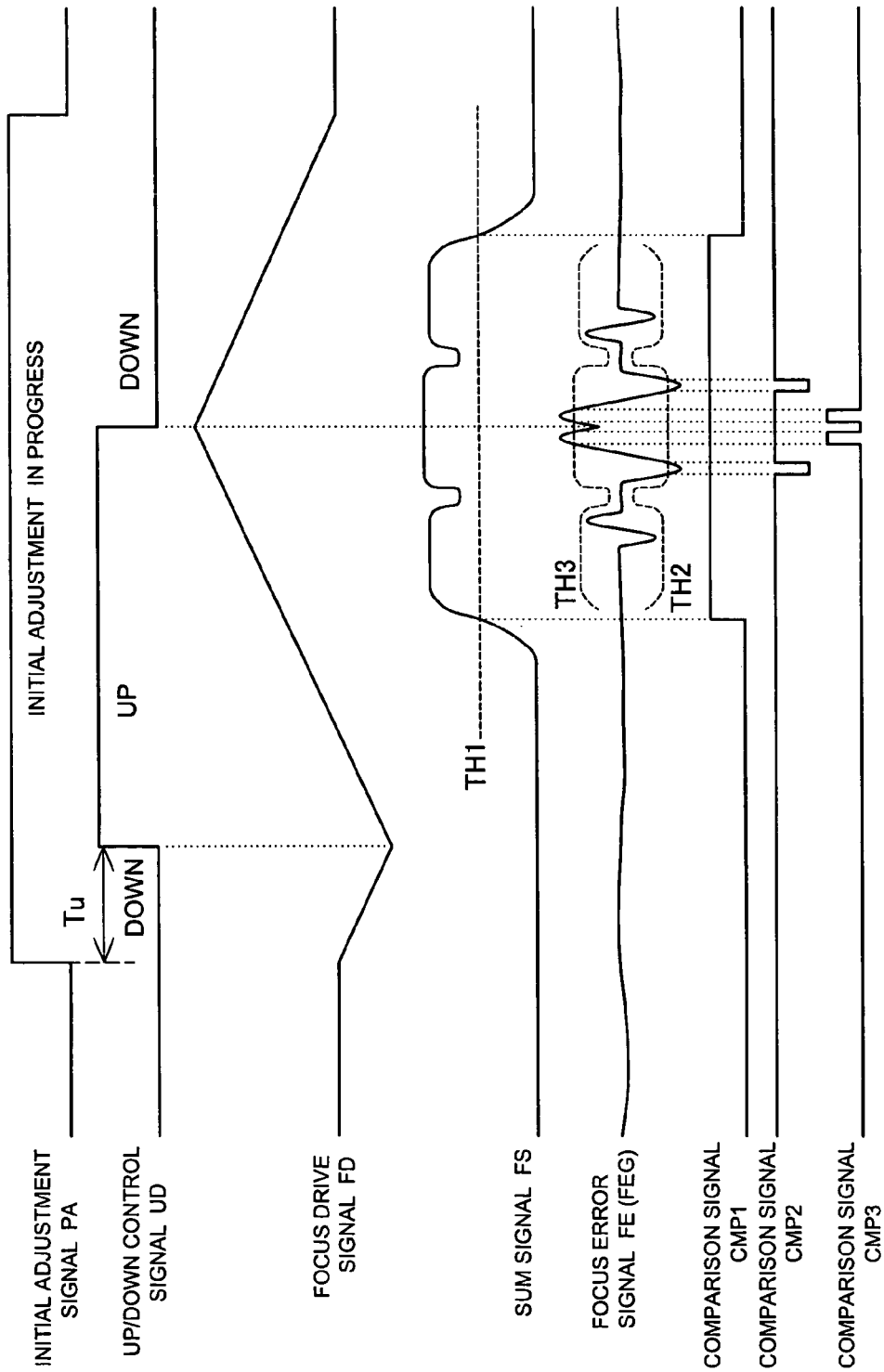

OPTICAL PICKUP DEVICE AND APPARATUS FOR READING DATA FROM OPTICAL STORAGE MEDIUM

BACKGROUND OF THE INVENTION

1. Field of the Invention

The present invention relates to an optical pickup device for optically reproducing information recorded on an optical storage medium such as CD (Compact Disc), DVD (Digital Versatile Disc) or LD (Laser Disc), and for optically recording information on the optical storage medium.

2. Description of the Related Art

An optical pickup device reproduces information recorded on an optical recording medium by irradiating the optical recording medium with laser light, and detecting reflected light (return light) from the optical recording medium. The laser light is focused on an information recording layer of the optical recording medium by an objective lens. It is necessary to prevent the position of a focused spot of the laser light from deviating from the focal position due to fluctuations such as an oscillating surface of the optical recording medium. For this purpose, the optical pickup device is equipped with a focus servo mechanism for driving the objective lens in real time to compensate for fluctuations of the optical recording medium.

The focus servo mechanism conducts a feedback control (i.e., focus servo control) which involves detecting return light from an optical recording medium to generate a focus error signal using the detected signal, and applying the focus error signal to an actuator for driving an objective lens. Due to differences in surface reflectivity and the like depending on the type of optical recording media, an initial adjustment must be done prior to the execution of the focus servo for adjusting the gain for the focus error signal, and the like in accordance with a particular optical recording medium.

Patent document 1 (Laid-open Japanese Patent Application No. 10-31828) discloses an exemplary initial adjusting method for a focus servo. This initial adjusting method applies a sawtooth voltage to a focus coil of an actuator a plurality of times to reciprocally move an objective lens. The reciprocal movements result in a focus error signal which has a sigmoidal curve or an inverted sigmoidal curve (hereinafter referred to as the "S-curve") when the objective lens passes a focal position. The amplitude of the S-curve of the focus error signal is measured to determine a proper gain for a variable gain amplifier in accordance with the result of the measurement. FIG. 1 schematically shows the waveform of an FD signal representing a sawtooth voltage, and the waveform of a focus error signal (hereinafter referred to as the "FE signal") corresponding thereto. During a period in which the FD signal increases in level, the objective lens is moved in a direction closer to the optical disc, whereas during a period in which the FD signal decreases in level, the objective lens is moved in a direction away from the optical disc. As shown in FIG. 1, the S-curve of the focus error signal appears in a very narrow range near a focal point.

However, the initial adjusting method described in the aforementioned patent document 1 is likely to cause the objective lens to collide with the optical disc. Generally, the sawtooth voltage is set at a frequency in a range significantly lower than a servo bandwidth due to the characteristics of the actuator. Also, the actuator has a very high drive sensitivity corresponding to the frequency of the sawtooth voltage. Therefore, if the reciprocal motion of the objective lens largely fluctuates in amplitude due to variations in the drive sensitivity and drive gain of the actuator, the objective lens can collide with the optical disc.

Also, in recent years, there is an ongoing tendency to shorten the wavelength of laser light and increase NA (numerical aperture) of the objective lens for reducing the spot diameter of focused laser light to achieve a higher recording density. Since this tendency is accompanied with a shorter working distance between the objective lens and optical recording medium, the objective lens is more likely to collide with the optical disc, resulting in requirements for highly accurate initial adjustments.

SUMMARY OF THE INVENTION

In view of the foregoing, it is an object of the present invention to provide an optical pickup device which is capable of preventing an objective lens from colliding with an optical recording medium at an initial adjustment stage, and performing highly accurate initial adjustments, and an apparatus for reading an optical recording medium which is equipped with the optical pickup device.

According to a first aspect of the invention, there is provided an optical pickup device for irradiating an information recording layer of an optical recording medium with a light beam and detecting a reflected light beam reflected on information recording layer. The optical pickup device comprises an objective lens for focusing the light beam onto the information recording layer; a lens driver for moving the position of the objective lens in response to a drive signal supplied thereto; a photo-detector having a plurality of light receiving areas, each light receiving area receiving the reflected light beam and generating an output signal in accordance with the received light beam; a signal generator for generating a single or a plurality of servo signals from the output signals of the photo-detector; a drive signal generator for generating a first focus drive signal for activating the lens driver to move the objective lens in a direction closer to the information recording layer, or a second focus drive signal for activating the lens driver to move the objective lens in a direction away from the information recording layer, and supplying the first focus drive signal or the second focus drive signal to the lens driver as the drive signal; and a controller for executing a switching process for switching the drive signal supplied to the lens driver from the first focus drive signal to the second focus drive signal when the level of the servo signal changes by a predetermined range or more during a period in which the drive signal generator supplies the first focus drive signal to the lens driver.

According to a second aspect of the invention, an apparatus for reading data from an optical storage medium is provided. The apparatus comprises the optical pickup device, and a decoder for decoding a reproduced signal output from the optical pickup device.

Further features of the invention, its nature and various advantages will be more apparent from the accompanying drawings and the following detailed description of the preferred embodiments.

BRIEF DESCRIPTION OF THE DRAWINGS

FIG. 21 is a flow chart showing a procedure of the initial adjustment process of a sixth embodiment;

FIG. 22 is a timing chart showing a variety of signal waveforms which appear when the initial adjustment process is executed for an optical disc which has a single information recording layer; and FIG. 23 is a timing chart showing a variety of signal waveforms which appear when the initial adjustment process is executed for an optical disc which has two information recording layers.

DETAILED DESCRIPTION OF THE INVENTION

In the following, a variety of embodiments of the present invention will be described.

Figure 1:
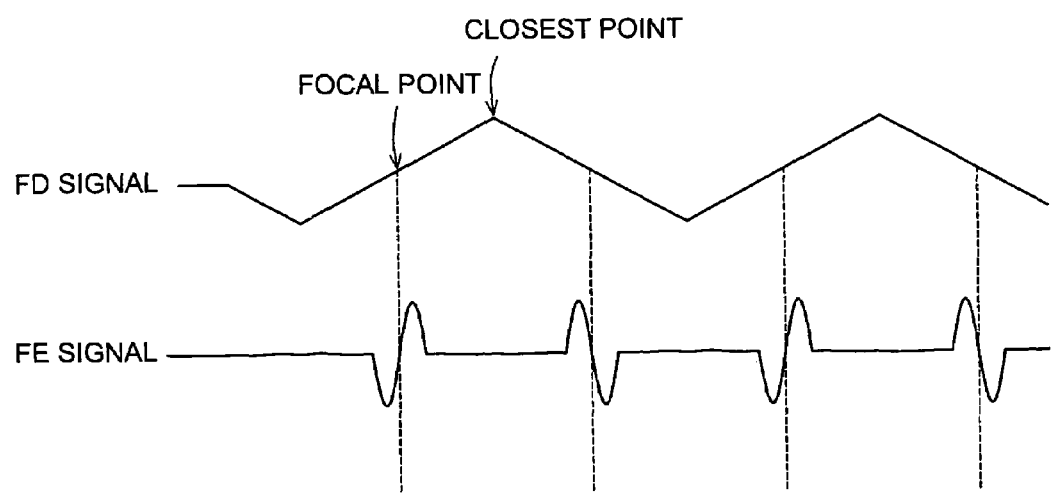
FIG. 1 is a diagram schematically showing the sawtooth waveform of a focus drive signal, and the waveform of a focus error signal corresponding thereto.
Figure 2:
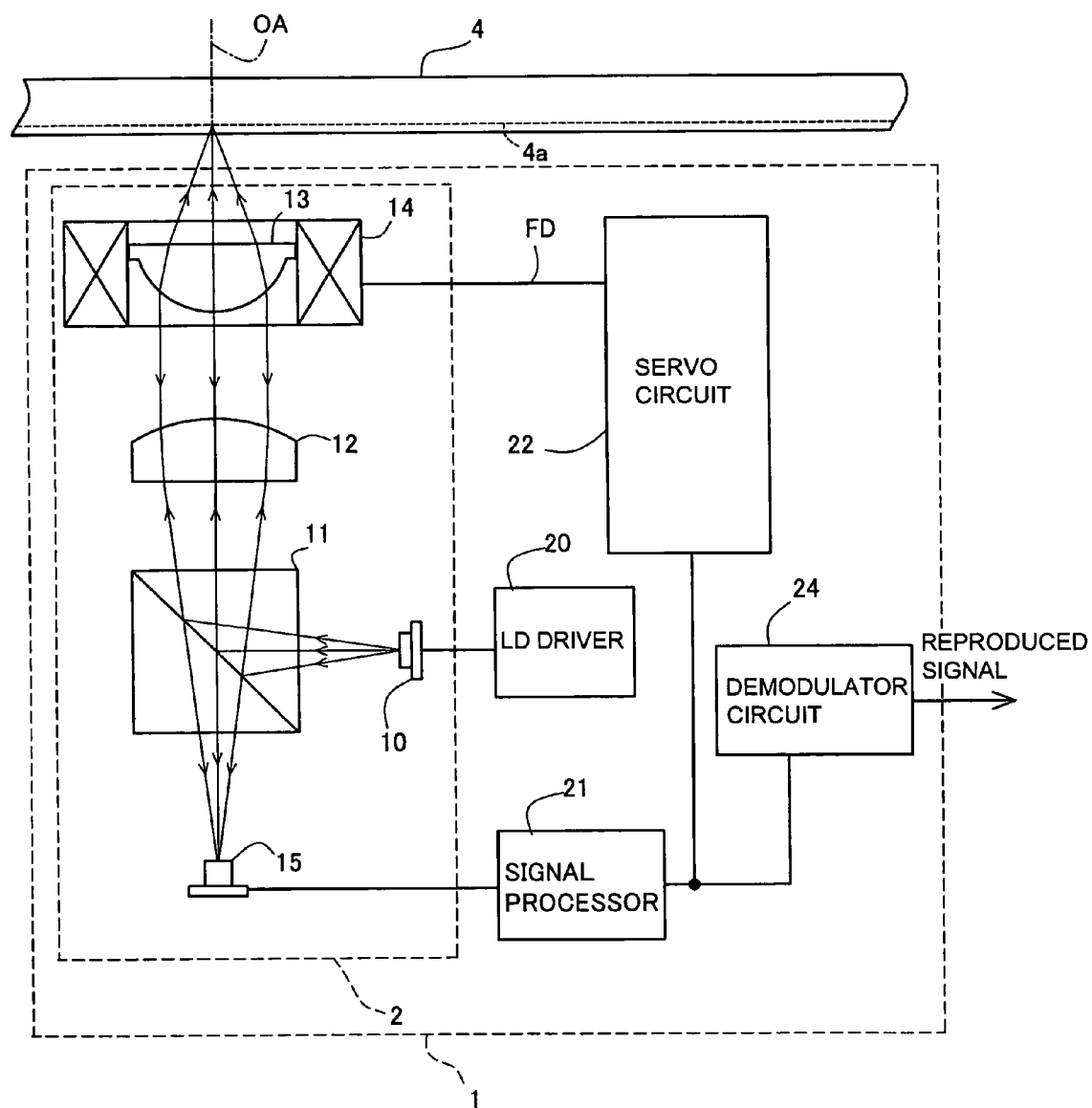
FIG. 2 is a diagram schematically showing a configuration of an optical pickup device which is an embodiment of the present invention.

FIG. 2 schematically shows a configuration of an optical pickup device 1 which is an embodiment. This optical pickup device 1 comprises an optical head 2; an LD driver (laser diode driver) 20; a signal processor 21; a servo circuit 22; and a demodulator circuit 24. The optical head 2 further comprises a laser diode light source 10; a beam splitter 11; a collimator lens 12; an objective lens 13; an actuator 14; and a photo-detector 15. The beam splitter 11, collimator lens 12, and objective lens 13 are arranged along an optical axis OA. Also, a discoidal optical disc (optical recording medium) 4 has an information recording layer 4a formed with microscopic pits or signal grooves indicative of information. The optical disc 4 is driven to rotate during recording/reproduction.

The laser diode light source 10 emits a light beam in accordance with a current supplied by the LD driver 20. The coherent light beam emitted from the laser diode light source 10 is reflected by the beam splitter 11, collimated by the collimator lens 12, and enters into the objective lens 13. Then, the objective lens 13 focuses the light beam entering from the collimator lens 12 onto signal grooves on the information recording layer 4a.

A reflected light beam from the optical disc 4 passes through the objective lens 13, a collimator lens 12 and a beam splitter 11 in order, and enters into a photo-detector 15. The photo-detector 15 receives and photoelectrically converts the reflected light beam into a detected signal which is output to the signal processor 21. The signal processor 21 performs current-voltage conversion of the detected signal applied from the photo-detector 15, and supplies the resulting signal to the servo circuit 22 and demodulator circuit 24, respectively. The demodulator circuit 24 demodulates the input signal to generate a reproduced signal.

The servo circuit 22, on the other hand, generates a drive signal FD from the signal applied from the signal processor 21, and supplies the drive signal FD to the actuator 14. The actuator 14 moves the position of the objective lens 13 in a direction perpendicular to the information recording layer 4a (focus direction) in response to the drive signal FD. While the servo circuit 22 of this embodiment only has functions of performing focus servo and initial adjustments therefor, the servo circuit 22 may have functions of performing tracking servo, tilt servo, and the like.

Figure 3:
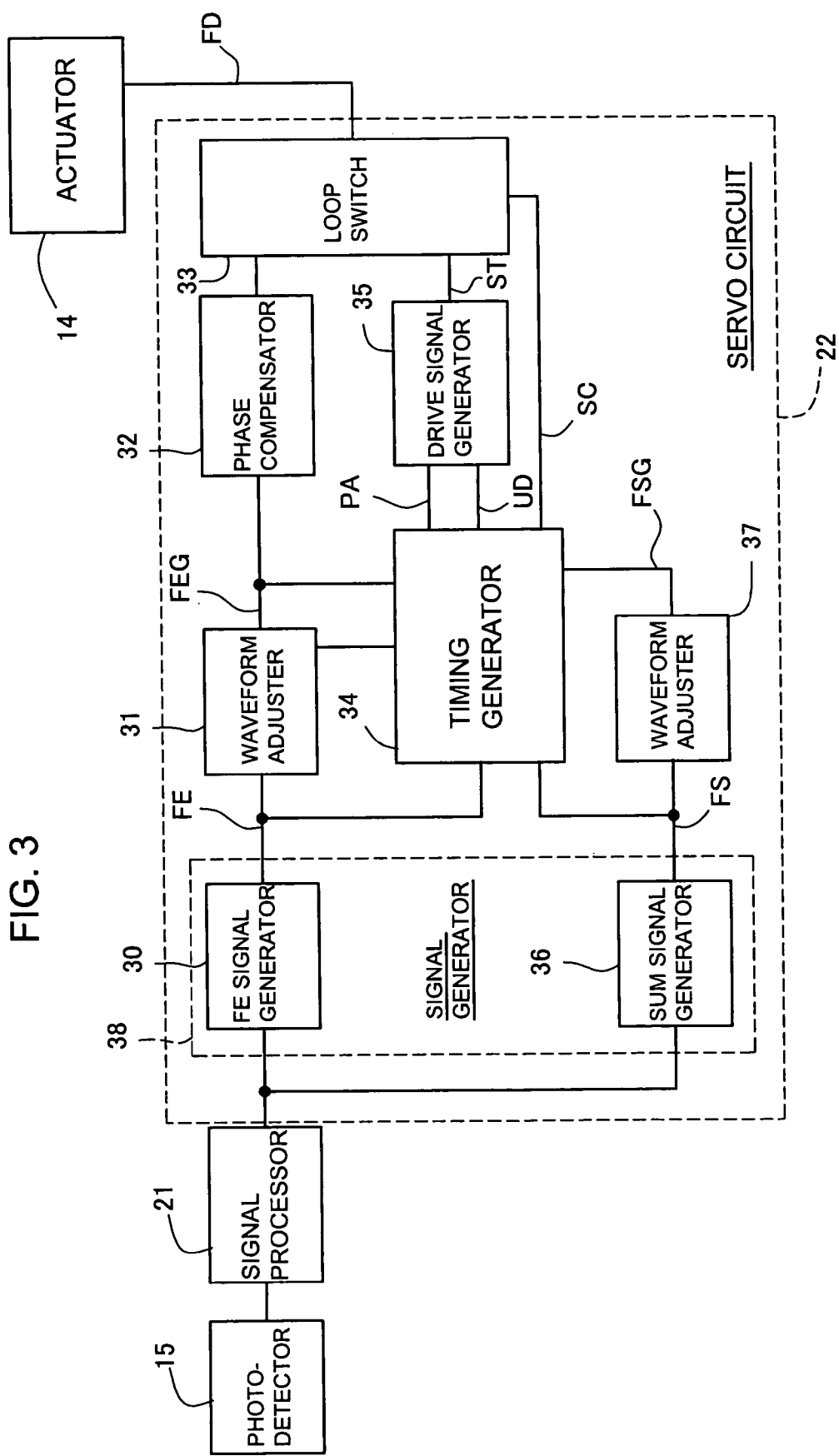
FIG. 3 is a diagram schematically showing a configuration of a servo circuit which is an embodiment of the present invention.

FIG. 3 schematically shows a configuration of the servo circuit 22. The servo circuit 22 includes a signal generator 38; a waveform adjuster 31; a phase compensator 32; a loop switch 33; a waveform adjuster 37; a timing generator 34; and a drive signal generator 35. The photo-detector 15 includes a plurality of light receiving areas (not shown), each of which photoelectrically converts incident light to generate a detected signal and output the detected signal. The signal processor 21 performs current-voltage conversion of a plurality of detected signals from the plurality of light receiving areas, and supplies the resulting signals to the servo circuit 22. The signal generator 38, which includes a focus error signal generator 30 and a sum signal generator 36, generates a servo signal for use in feedback control. The focus error signal generator 30 generates a focus error signal FE using the plurality of detected signals supplied from the signal processor 21 based on a known astigmatic method, spot size method, or the like, and supplies the focus error signal FE to the waveform adjuster 31 and timing generator 34. The sum signal generator 36 adds up the plurality of detected signals supplied from the signal processor 21 to generate a sum signal FS which is supplied to the waveform adjuster 37 and timing generator 34.

Figure 4:
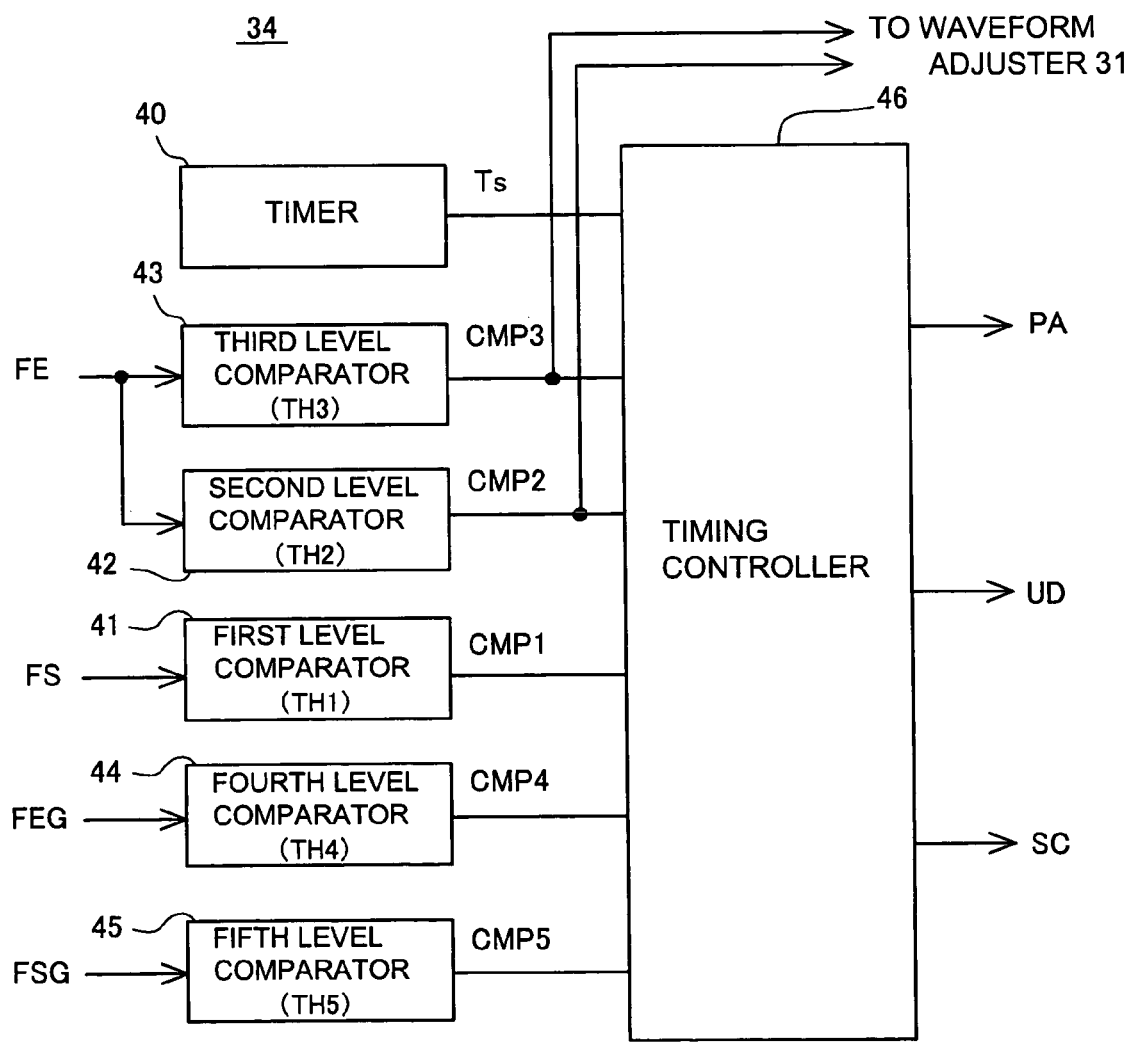
FIG. 4 is a diagram schematically showing a configuration of a timing generator which is an embodiment of the present invention.

The timing generator 34 includes a timer 40; five level comparators 41-45; and a timing controller 46, as shown in FIG. 4. The timing controller 46 is a component which corresponds to a controller of the present invention that contains a microprocessor (not shown). The timer 40 measures a time period from a time indicated by the timing controller 46, and applies the measurement result Ts to the timing controller 46. Each of the level comparators 41-45 compares a threshold held therein with the level of an input signal, and outputs a high level signal to the timing controller 46 when the level of the input signal is equal to or higher than the threshold, and a low level signal to the timing controller 46 when the level of the input signal is lower than the threshold. The first level comparator 41 compares a threshold TH1 held therein with the level of the sum signal FS to output a comparison signal CMP1, while the second level comparator 42 and third level comparator 43 compare thresholds TH2 and TH3 held therein with the level of the focus error signal FE, respectively, and output comparison signals CMP2 and CMP3. The fourth level comparator 44 compares a threshold TH4 held therein with the level of a focus error signal FEG, after waveform shaped, supplied from the waveform adjuster 31, and outputs the comparison result CMP4. The fifth level comparator 45 compares a threshold TH5 held therein with the level of a sum signal FSG, after waveform shaped, supplied from the waveform adjuster 37, and outputs the comparison result CMP5.

Figure 5:
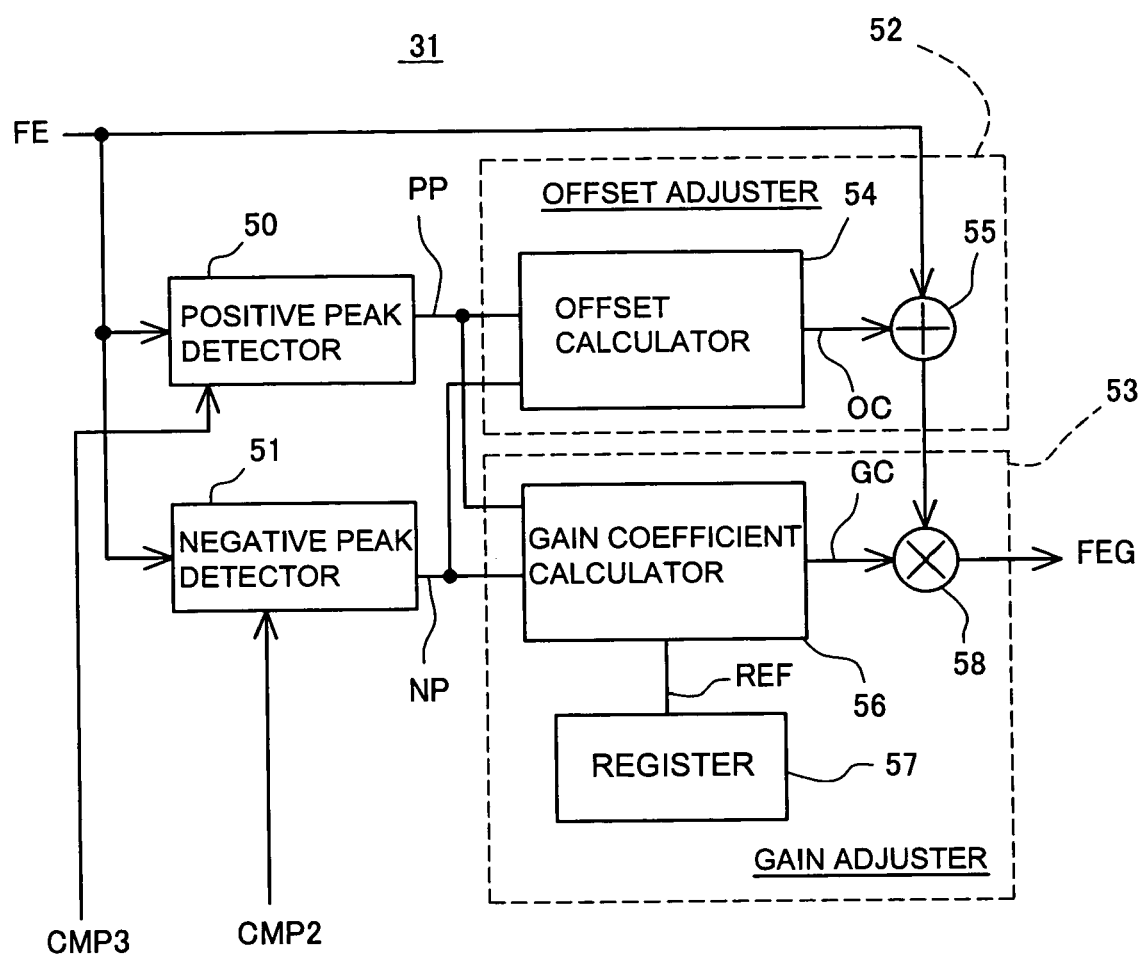
FIG. 5 is a diagram schematically showing a configuration of a waveform adjuster for adjusting the waveform of a focus error signal.

Next, the waveform adjuster 31 includes a positive peak detector 50; a negative peak detector 51; an offset adjuster 52; and a gain adjuster 53, as shown in FIG. 5. The positive peak detector 50 detects a positive peak value (maximum value) of the focus error signal FE input during a period in which the comparison signal CMP3 (see FIG. 4) supplied from the timing generator 34 is at high level. The negative peak detector 51 detects a negative peak value (minimum value) of the focus error signal FE input during a period in which the comparison signal CMP2 (see FIG. 4) supplied for the timing generator 34 is at low level. AS the results of the detections made by the positive peak detector 50 and negative peak detector 51, the positive peak value PP and negative peak value NP, are applied to the offset adjuster 52 and gain adjuster 53.

The offset adjuster 52 has a function of offsetting the focus error signal FE. An offset calculator 54 calculates an average of the positive peak value PP and negative peak value NP (=(PP+NP)/2) as an offset value OC which is applied to an adder 55. The gain adjuster 53 holds a target amplitude value REF in a register 57. A gain coefficient calculator 56 multiplies the target amplitude value REF supplied from the register 57 by an inverse of the difference between the positive peak value PP and negative peak value NP (=PP−NP) to calculate a gain coefficient GC (=REF/(PP−NP)) which is applied to a multiplier 58. In this way, the offset value OC and gain coefficient GC are calculated as parameters for adjusting the waveform of the focus error signal FE.

The adder 55 also subtracts the offset value OC from the focus error signal FE, and outputs the resulting difference to the gain adjuster 53. The multiplier 58 multiplies the offset-adjusted focus error signal by the gain coefficient GC. As a result, the multiplier 58 can adjust the waveform of the focus error signal FE in offset and gain to output a focus error signal FEG.

Figure 6:
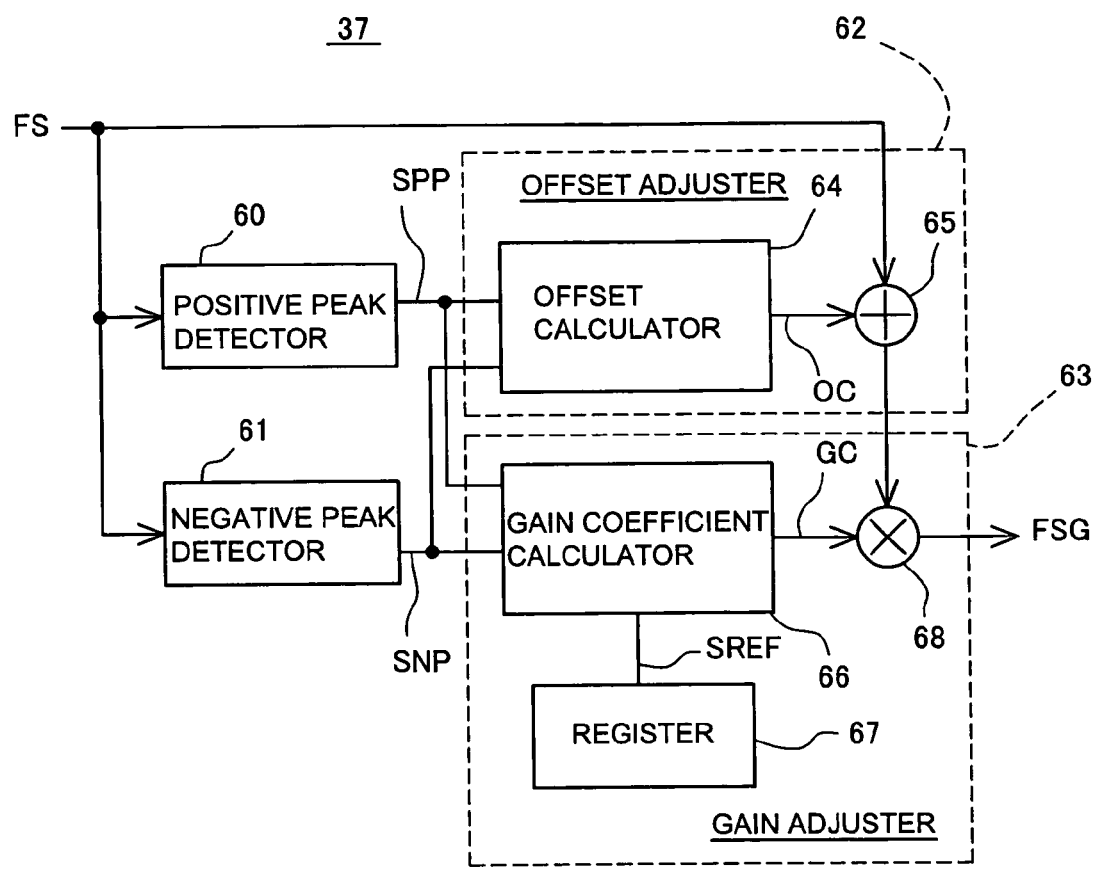
FIG. 6 is a diagram schematically showing a configuration of a waveform adjuster for adjusting the waveform of a sum signal.

As shown in FIG. 6, the other waveform adjuster 37 includes a positive peak detector 60 for detecting a maximum value (positive peak value) SPP of the input sum signal FS; and a negative peak detector 61 for detecting a minimum value (negative peak value) SNP of the same. In the offset adjuster 62, an offset calculator 64 calculates an average of the positive peak value SPP and negative peak value SNP (=(SPP+SNP)/2) as an offset value OC, such that an adder 65 subtracts the offset value OC from the sum signal FS and outputs the resulting difference to the gain adjuster 63. Also, the gain adjuster 63 holds a target amplitude value SREF in a register 67. A gain coefficient calculator 66 multiplies the target amplitude value SREF supplied from the register 67 by an inverse of the difference between the positive peak value SPP and negative peak value SNP (=SPP−SNP) to calculate a gain coefficient (GC=SREF×(SPP−SNP)). A multiplier 68 multiplies an offset-adjusted sum signal by the gain coefficient GC. As a result, the multiplier 68 can adjust the waveform of the sum signal FS in offset and gain to output a sum signal FSG.

The focus error signal FEG, which has been waveform-shaped by the waveform adjuster 31, is adjusted in phase by the phase compensator 32 before being applied to the loop switch 33. On the other hand, the drive signal generator 35 generates a sawtooth signal (a focus control signal for initial adjustments) in accordance with a combination in level of the initial adjustment signal PA supplied from the timing generator 34 and an up/down control signal UD, and supplies the sawtooth signal ST to the loop switch 33.

During an initial adjustment period, the loop switch 33 selects the sawtooth signal ST in response to the level of a switching control signal SC supplied from the timing generator 34, and supplies the actuator 14 with the sawtooth signal ST as a drive signal FD. After completion of the initial adjustments, the loop switch 33 selects the focus error signal FEG supplied through the phase compensator 32, and supplies the actuator 14 with the focus error signal FEG as the drive signal FD to form a focus servo loop.

Figure 7:
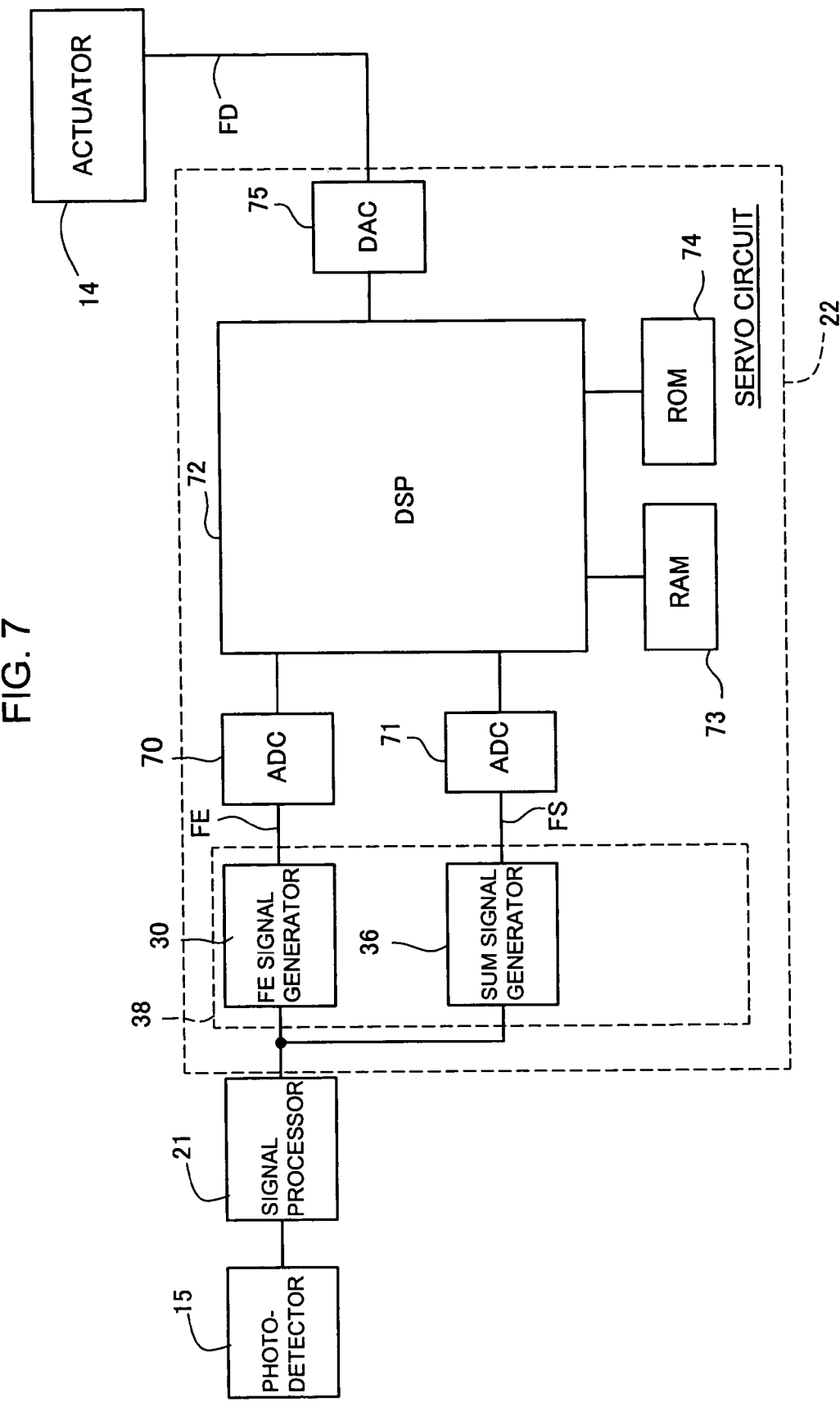
FIG. 7 is a diagram schematically showing a configuration of a servo circuit which is equipped with a DSP.

While the foregoing servo circuit 22 is mainly composed of analog circuits, the servo circuit 22 may be based on a DSP (digital signal processor) 72, as shown in FIG. 7. In this configuration, the servo circuit 22 includes A/D converters (ADC) 70, 71 for converting analog signals inputted from the focus error signal generator 30 and sum signal generator 36 to digital signals, respectively; the DSP 72 for executing digital processing using a RAM 73 and a ROM 74; and a D/A converter (DAC) 75 for converting an output signal of the DSP 72 to an analog signal. The DSP 72 includes a microprocessor, a digital signal processor, a signal transfer bus, a DMA controller, and the like. Alternatively, the DSP 72 may include digital circuits for executing digital processing corresponding to the analog processing executed by the waveform adjuster 31, phase compensator 32, loop switch 33, timing generator 34, drive signal generator 35, and waveform adjuster 37 shown in FIG. 3. Such processing may be executed by software.

Figure 8:
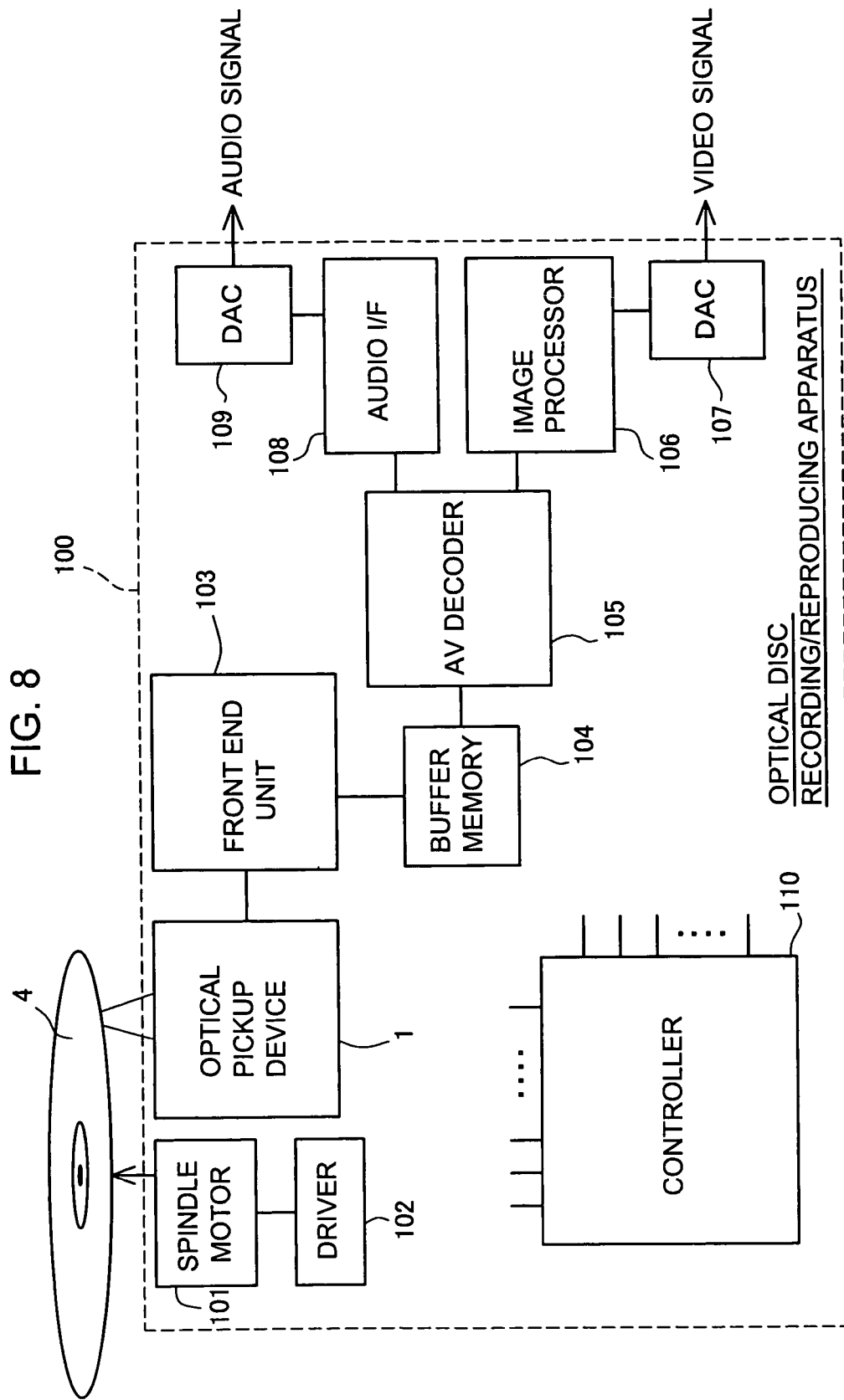
FIG. 8 is a block diagram schematically showing a configuration of an optical disc recording/reproducing apparatus which is equipped with the optical pickup device which is an embodiment of the present invention.

The optical pickup device 1 having the foregoing configuration may be mounted, for example, in an optical disc recording/reproducing apparatus for recording and/or reproducing multimedia data such as video data, audio data, and the like. FIG. 8 is a block diagram schematically showing an exemplary configuration of an optical disc recording/reproducing apparatus 100 which is equipped with the optical pickup device 1.

The operation of the optical disc recording/reproducing apparatus 100 will be described below in brief. A spindle motor 101 is powered from a driver 102 to drive an optical disc 4 for rotation upon recording/reproduction of information. The optical pickup device 1 irradiates an information recording layer 4a of the optical disc 4 with a focused beam, detects light reflected from the optical disc 4, generates a reproduced signal (RF signal) from the detected signal, and outputs the reproduced signal to a front end unit 103. The front end unit 103 decodes the reproduced signal which has been encoded in conformity to a physical format of the optical disc 4, and outputs the decoded data to a buffer memory 104. The decoded data is temporarily stored in the buffer memory 104, and then transferred to an AV decoder 105. Then, the AV decoder 105 decodes the compressed and encoded data transferred in accordance with the MPEG (Moving Picture Experts Group) scheme or the like to generate video data and audio data which are output to an image processor 106 and an audio interface 108, respectively. The video data undergoes gradation processing, OSD (On Screen Display) processing, and so on by the image processor 106, and then is converted to an analog video signal by a D/A converter 107. The audio data, after modulated by the audio interface 108, is converted to an analog audio signal by a D/A converter 109 and output. The foregoing processing blocks such as the image processor 106, audio interface 108, AV decoder 105, front end unit 103, driver 102, and the like, are connected to and controlled by a controller 110 including a CPU and the like, through a control bus and a data bus (not shown).

In addition to the reproduction processing blocks 101-110 for reproducing video and audio, the optical disc recording/reproducing apparatus 100 shown in FIG. 8 also has information recording processing blocks (not shown) for A/D converting analog video signal and audio signal input from the outside, and for compressing, encoding the converted digital signals, converting the digital signals in conformity to the physical format, and writing the video data and audio data into the optical disc 4 through the optical pickup device 1.

The following description will be made on certain embodiments of an initial adjusting method for the focus servo in the optical pickup device 1 which has the foregoing configuration.

1. First Embodiment

Figure 9:
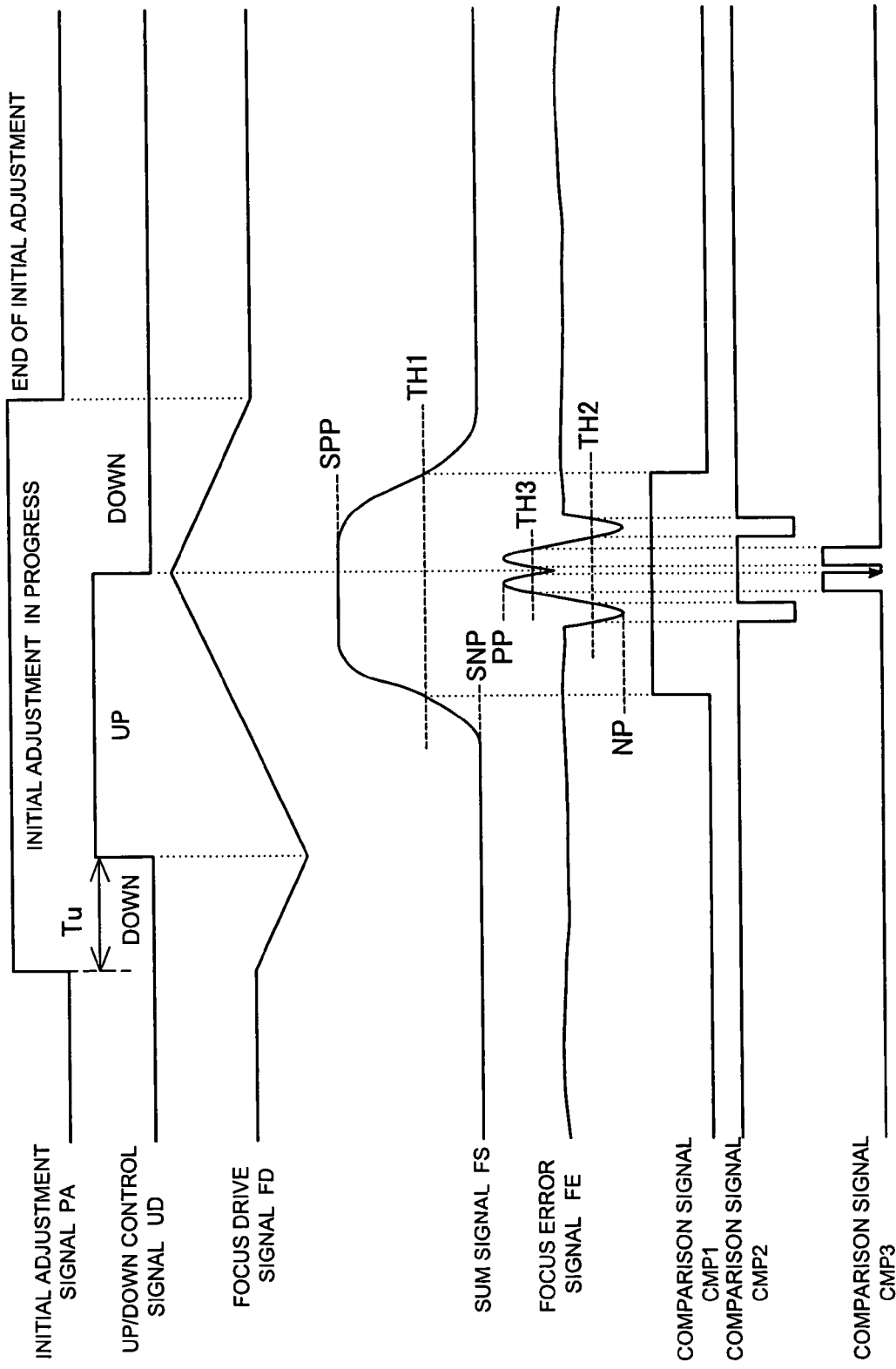
FIG. 9 is a timing chart showing a variety of signal waveforms which are generated when an initial adjustment process is performed in accordance with a first embodiment.
Figure 10:
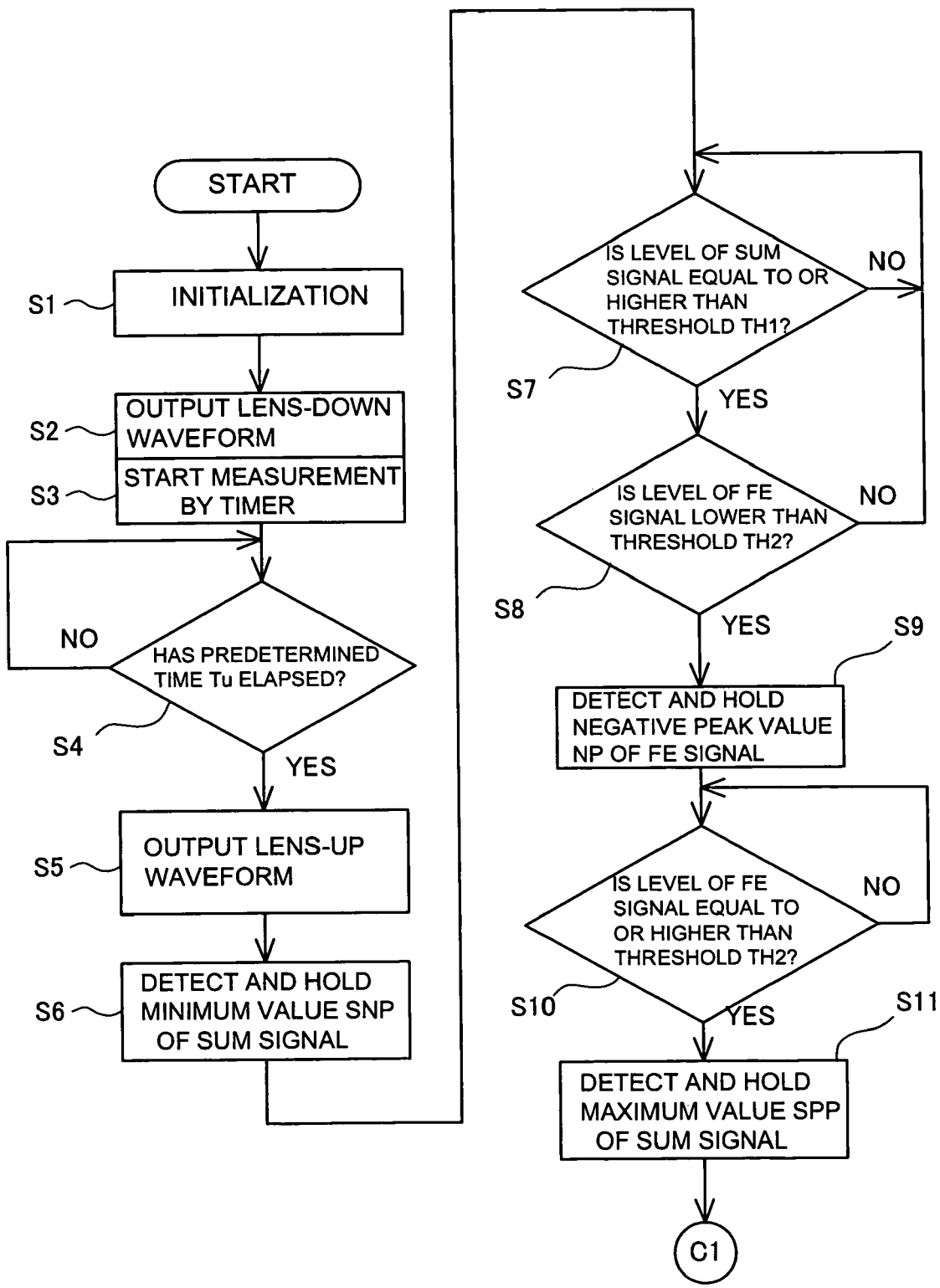
FIG. 10 is a flow chat showing a procedure of an initial adjustment process of the first embodiment.
Figure 11:
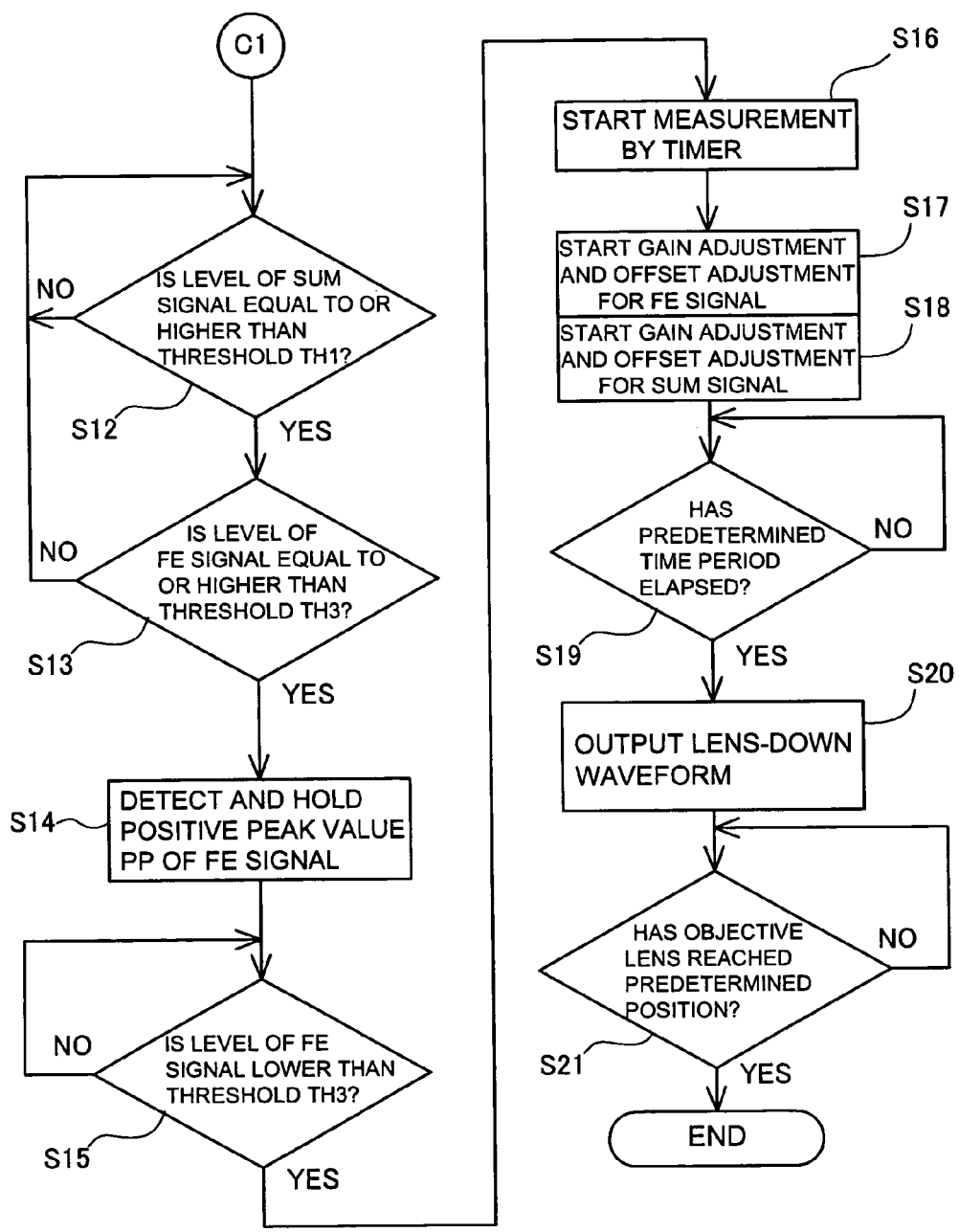
FIG. 11 is a flow chat showing a procedure of an initial adjustment process of the first embodiment.

FIG. 9 is a timing chart showing a variety of signal waveforms which are generated when the initial adjustment process is executed in accordance with a first embodiment. FIGS. 10 and 11 are flow charts showing a procedure of the initial adjustment process. The flow charts of FIGS. 10 and 11 are connected through a connector C1. In the following, the procedure of the initial adjustment process of this embodiment will be described with reference to FIGS. 9 to 11.

As the timing controller 46 issues an initial adjustment starting instruction, initialization at step S1 is first executed. Here, the count value of the timer 40 (see FIG. 4) is initialized, and the up/down control signal UD, initial adjustment signal PA, and switching control signal SC are all set to low level. Accordingly, the loop switch 33 selects a signal input from the drive signal generator 35.

Next, the signal level of the initial adjustment signal PA is switched from low level to high level (step S2), and simultaneously, a counting operation of the timer 40 is started (step S3). The drive signal generator 35 can output either a lens-up waveform or a lens-down waveform only during a period in which the initial adjustment signal PA is a high level signal. The drive signal generator 35 outputs a focus drive signal (lens-down waveform) for activating the actuator 14 to gradually move the objective lens 13 in the direction away from the information recording layer 4a during a period in which the initial adjustment signal PA is at high level and the up/down control signal UD is at low level, and outputs a focus drive signal (lens-up waveform) for activating the actuator 14 to gradually move the objective lens 13 in the direction closer to the information recording layer 4a during a period in which the initial adjustment signal PA is at high level and the up/down control signal UD is at high level.

At step S2, the drive signal generator 35 is supplies with the initial adjustment signal PA at high level and the up/down control signal UD at low level, causing the drive signal generator 35 to supply the lens-down waveform ST to the actuator 14 through the loop switch 33. In the meantime, the objective lens 13 is driven downward away from the information recording layer 4a.

Next, the timing controller 46 determines whether or not a predetermined time period Tu has elapsed from the time of a rising edge of the initial adjustment signal PA based on a count signal Ts supplied from the timer 40 (step S4). Upon determining that the predetermined time period Tu has elapsed, the timing controller 46 determines that the objective lens 13 is sufficiently spaced away form the optical disc 46, and switches the up/down control signal UD from low level to high level to supply the lens-up waveform ST to the actuator 14 (step S5). From this time, the direction in which the objective lens 13 is driven is changed from the direction away from the optical disc 4 to the direction toward the optical disc 4.

At next step S6, the negative peak detector 61 of the waveform adjuster 37 detects a minimum value SNP of a sum signal FS supplied from the sum signal generator 36, and outputs the minimum value SNP to the offset adjuster 62 and gain adjuster 63. The offset calculator 64 of the offset adjuster 62 and the gain coefficient calculator 66 of the gain adjuster 63 respectively hold the minimum value SNP. At this stage, the objective lens 13 continuously moves toward the optical disc 4. As the objective lens 13 approaches the focal position, the amount of light received by the photo-detector 15 increases to cause the sum signal FS to have a higher level.

Subsequently, the timing controller 46 determines whether or not the level of the sum signal FS is equal to or higher than the threshold TH1 based on the comparison signal CMP1 supplied from the first level comparator 41 (step S7). Upon determining that the level of the sum signal FS is equal to or higher than the threshold TH1, the timing controller 46 again determines whether or not the level of the focus error signal FE is lower than the threshold TH2 based on the comparison signal CMP2 supplied from the second level comparator 42 (step S8). Upon determining that the level of the focus error signal FE is equal to or higher than the threshold TH2, a control is conducted to return the procedure to the aforementioned step S7. Specifically, as the objective lens 13 approaches the focal position, causing the level of the sum signal FS to be equal to or higher than the threshold TH1, the first level comparator 41 outputs the comparison signal CMP1 at high level. This causes the timing controller 46 to determine that the level of the sum signal FS is equal to or higher than the threshold TH1, followed by proceeding to step S8. Here, when the objective lens 8 passes near the focal position, the level of the focus error signal FE decreases to a minimum value, then increases to a maximum value, and again decreases, as shown in FIG. 9. In this way, the focus error signal FE forms a sigmoidal focusing waveform near the focal point. As the objective lens 13 approaches the focal point, causing the level of the focus error signal FE to decrease to lower than the threshold TH2, the second level comparator 42 outputs the comparison signal CMP2 at low level. This causes the timing controller 46 to determine that the level of the focus error signal FE is lower than the threshold TH2, followed by proceeding to next step S9.

At next step S9, the negative peak detector 51 (see FIG. 5) of the waveform adjuster 31 detects a negative peak value (minimum value) NP of the focus error signal FE. The negative peak detector 51 is supplied with the comparison signal CMP2 from the second level comparator 42, and the negative peak detector 51 detects the negative peak value NP of the focus error signal FE which is input during a period in which the comparison signal CMP2 is at low level, and outputs the detected negative peak value NP to the gain adjuster 53 and offset adjuster 52. In this way, since the negative peak value NP is detected only during a period in which the comparison signal CMP1 is at high level, and the comparison signal CMP2 is at low level, it is possible to prevent an erroneous detection of the negative peak value NP even when the focusing waveform of the focus error signal FE disturbs due to the influence of the surface condition of the optical disc 4 and noise.

Preferably, for further increasing the certainty with which the erroneous detection of the negative peak value NP is prevented, the timing controller 46 may monitor the comparison signal CMP1 for the level in parallel with the processing at step S9, such that the timing controller 46 aborts the detection of the negative peak value NP and returns the procedure to step S7 when the comparison signal CMP1 changes to low level.

At next step S10, the timing controller 46 determines whether or not the level of the focus error signal FE is equal to or higher than the threshold TH2 based on the comparison signal CMP2. When the level of the focus error signal FE increases to the threshold TH2 or higher after the negative peak value NP has been detected at the aforementioned step S9, the second level comparator 42 outputs the comparison signal CMP2 at high level. This causes the timing controller 46 to determine that the level of the focus error signal FE is equal to or higher than the threshold TH2, followed by proceeding to next step S11.

At step S11, the positive peak detector 60 (see FIG. 6) of the waveform adjuster 37 detects a maximum value SPP of the sum signal FS supplied from the sum signal generator 36, and outputs the maximum value SPP to the offset adjuster 62 and gain adjuster 63. The offset calculator 64 and gain adjuster 63 respectively hold the maximum value SPP input thereto. In the meantime, since the objective lens 13 is moving up toward the optical disc 4, the level of the focus error signal FE continues to increase even after it has passed a level corresponding to the focal point.

Afterwards, the timing controller 46 determines whether or not the level of the sum signal FS is equal to or higher than the threshold TH1 based on the comparison signal CMP1 (step S12). Upon determining that the level is equal to or higher than the threshold TH1, the timing controller 46 again determines whether or not the level of the focus error signal FE is equal to or higher than the threshold TH3 based on the comparison signal CMP3 supplied from the third level comparator 43 (step S13). Upon determining that the level of the focus error signal FE is lower than the threshold TH3, a control is conducted to return the procedure to the aforementioned step S12. When the level of the focus error signal FE increases to the threshold TH3 or higher after the objective lens 13 has passed the focal point, the third level comparator 43 outputs the comparison signal CMP3 at high level, causing the timing controller 46 to determine that the level of the focus error signal FE has increased to the threshold TH3 or higher, followed by proceeding to step S14.

At next step S14, the positive peak detector 50 (see FIG. 5) of the waveform adjuster 31 detects the positive peak value (maximum value) PP of the focus error signal FE. The positive peak detector 50 is supplied with the comparison signal CMP3 from the third level comparator 43, and the positive peak detector 50 detects the positive peak value PP of the focus error signal FE which is input during a period in which the comparison signal CMP3 is at high level, and outputs the detected positive peak value PP to the gain adjuster 53 and offset adjuster 52. In this way, since the positive peak value PP is detected only during the period in which the comparison signal CMP3 is at high level, it is possible to prevent an erroneous detection of the positive peak value PP even when the focusing waveform of the focus error signal FE disturbs due to the influence of the surface condition of the optical disc 4 and noise.

Subsequently, the timing controller 46 determines whether or not the level of the focus error signal FE is lower than the threshold TH3 (step S15), and upon determining that the level is lower than the threshold TH3, the timing controller 46 determines that the level of the focus error signal FE has changed by a predetermined range or more, followed by proceeding to step S16. Specifically, after the positive peak PP has been detected, the level of the focus error signal FE decreases to lower than the threshold TH3, causing a change from high level to low level of the comparison signal CMP3 output from the third level comparator 43. The timing controller 46 detects this falling edge of the comparison signal CMP3 to determine that the level of the focus error signal FE is lower than the threshold TH3.

The thresholds TH1, TH2, TH3 are stored in registers (not shown) of the first level comparator 41, second level comparator 42, and third level comparator 43, respectively. In this embodiment, these thresholds TH1 to TH3 are set at fixed values through the initial adjustment process, but the timing controller 46 may set the thresholds TH1, TH2, TH3 to be variable in accordance with particular situations, as will be later described. The thresholds TH2, TH3 are set between the positive peak value PP and negative peak value NP of the focus error signal FE, where the threshold TH2 is set at a value closer to the negative peak value NP than the positive peak value PP, while the threshold TH3 is set at a value closer to the positive peak value PP than the negative peak value NP.

The timing controller 46 also forces the timer 40 to start the measuring operation simultaneously with the detection of the falling edge of the comparison signal CMP3 (step S16).

Subsequently, a gain adjustment and an offset adjustment are started for the focus error signal (step S17), and a gain adjustment and offset adjustment are started for the sum signal FS (step S18). Specifically, at step S17, the offset calculator 54 of the offset adjuster 52 (see FIG. 5) calculates an offset value OC using the positive peak value PP and negative peak value NP applied from the positive peak detector 50 and negative peak detector 51, respectively, and the adder 55 subtracts the offset value OC from the incoming focus error signal FE to generate a focus error signal which is output to the gain adjuster 53. Also, the gain coefficient calculator 56 of the gain adjuster 53 calculates a gain coefficient GC using the positive peak value PP and negative peak value NP, while the multiplier 58 multiplies the offset-adjusted focus error signal by the gain coefficient GC to output a resulting focus error signal FEG.

At step S18, the offset calculator 64 (see FIG. 6) of the offset adjuster 62 calculates an offset value OC using the maximum value SPP and minimum value SNP applied from the positive peak detector 60 and negative peak detector 61, respectively, and the adder 65 subtracts the offset value OC from the incoming sum signal FS to generate a sum signal which is output to the gain adjuster 63. Also, the gain coefficient calculator 66 of the gain adjuster 63 calculates a gain coefficient GC using the maximum value SPP, minimum value SNP, and target amplitude value SREF, while the multiplier 68 multiplies the offset-adjusted sum signal by the gain coefficient GC to output a sum signal FSG.

While in this embodiment, the processing at steps S17 and S18 is executed after the processing at step S16, the present invention is not limited to this sequence of processing. The processing at steps S16, S17, S18 may be executed in parallel.

Next, the timing controller 46 determines whether or not a predetermined time period has elapsed from the time of the falling edge of the comparison signal CMP3 based on the count signal Ts (step S19). Also, the timing controller 46, when determining that the predetermined has elapsed, switches the up/down control signal UD from high level to low level, thereby causing the drive signal generator 35 to output the lens-down waveform ST (step S20). The actuator 14 drives the objective lens 13 in the direction away from the optical disc 4 using the lens-down waveform ST supplied from the drive signal generator 35 through the loop switch 33.

Afterwards, the timing controller 46 determines whether or not the objective lens 13 has reached a predetermined position (step S21). Upon determining that the objective lens 13 has reached the predetermined position, the timing controller 46 switches the initial adjustment signal PA from high level to low level, followed by termination of the initial adjustment process.

In this way, according to the initial adjustment process of the first embodiment, when the level of the focus error signal FE changes by a predetermined range or more, the focus drive signal FD supplied to the actuator 14 is switched from the lens-up waveform to the lens-down waveform, so that the direction in which the objective lens 13 is driven is changed from the direction toward the information recording layer 4a to the opposite direction. Since the driving direction of the objective lens 13 is changed near the focal point, the objective lens 13 can be prevented from colliding with the optical disc 4 through the initial adjustment process, and a time required for the initial adjustment process can be reduced.

Further, since the driving direction of the objective lens 13 is changed based on the focus error signal FE, the collision of the two parties can be avoided without fail even if there is an extremely short working distance between the objective lens 13 and optical disc 4. It is therefore possible to sufficiently support a reduction in the wavelength of the optical beam and an increase in the resolution of the objective lens 13 for improving the recording density of the optical disc 4.

2. Second Embodiment

Figure 12:
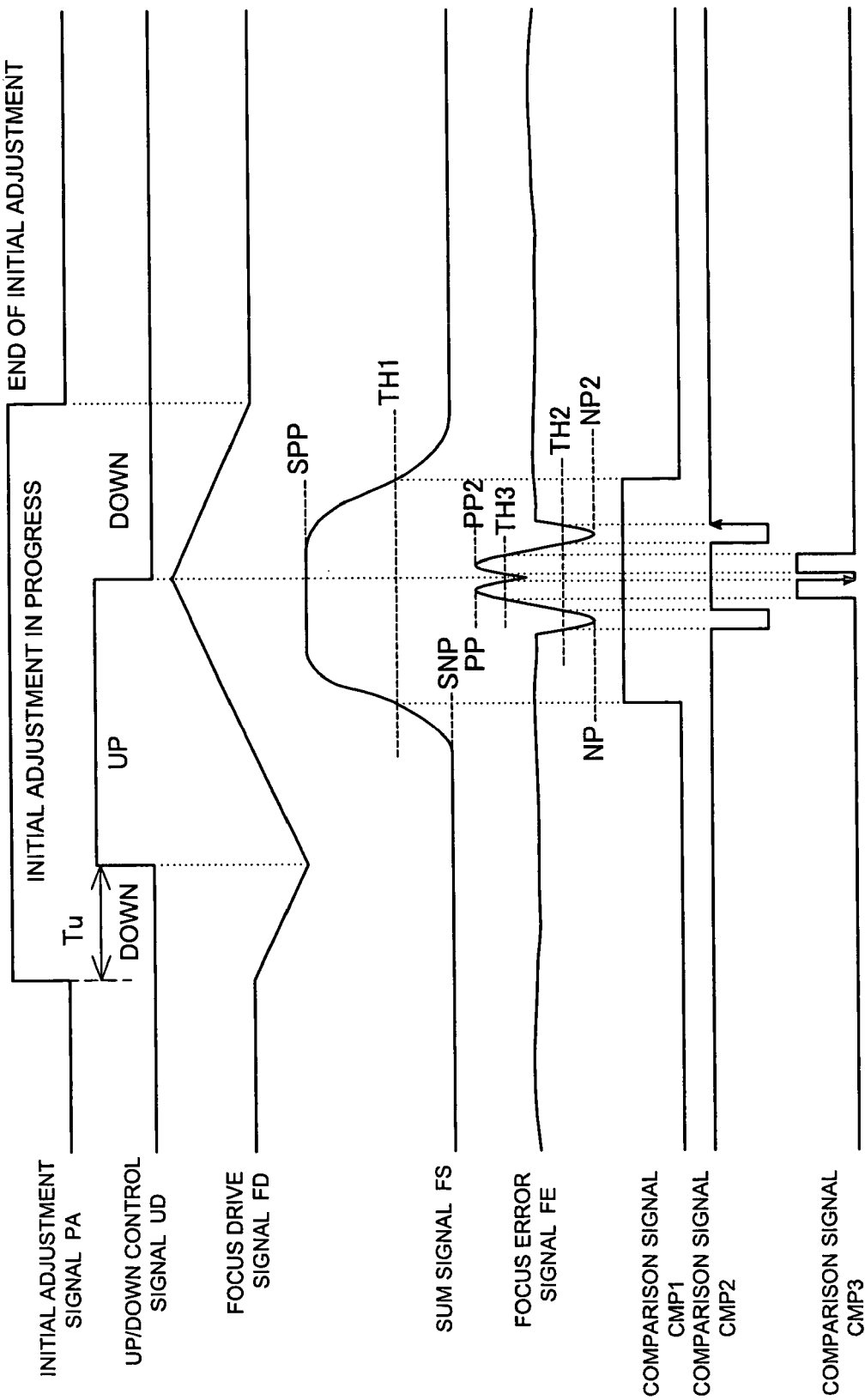
FIG. 12 is a timing chart showing a variety of signal waveforms which are generated when the initial adjustment process is performed in accordance with a second embodiment.
Figure 13:
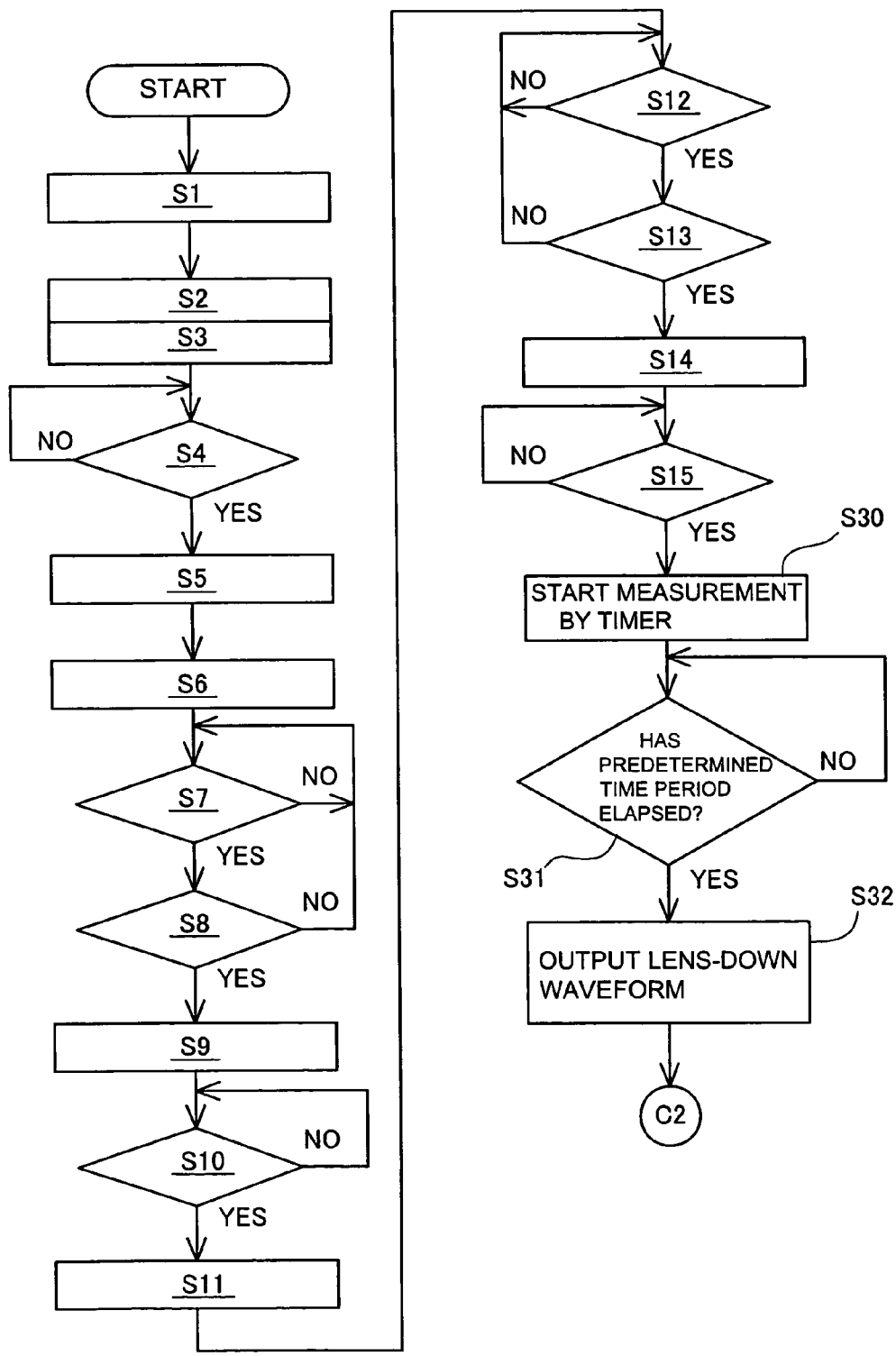
FIG. 13 is a flow chart showing a procedure of the initial adjustment process of the second embodiment.
Figure 14:
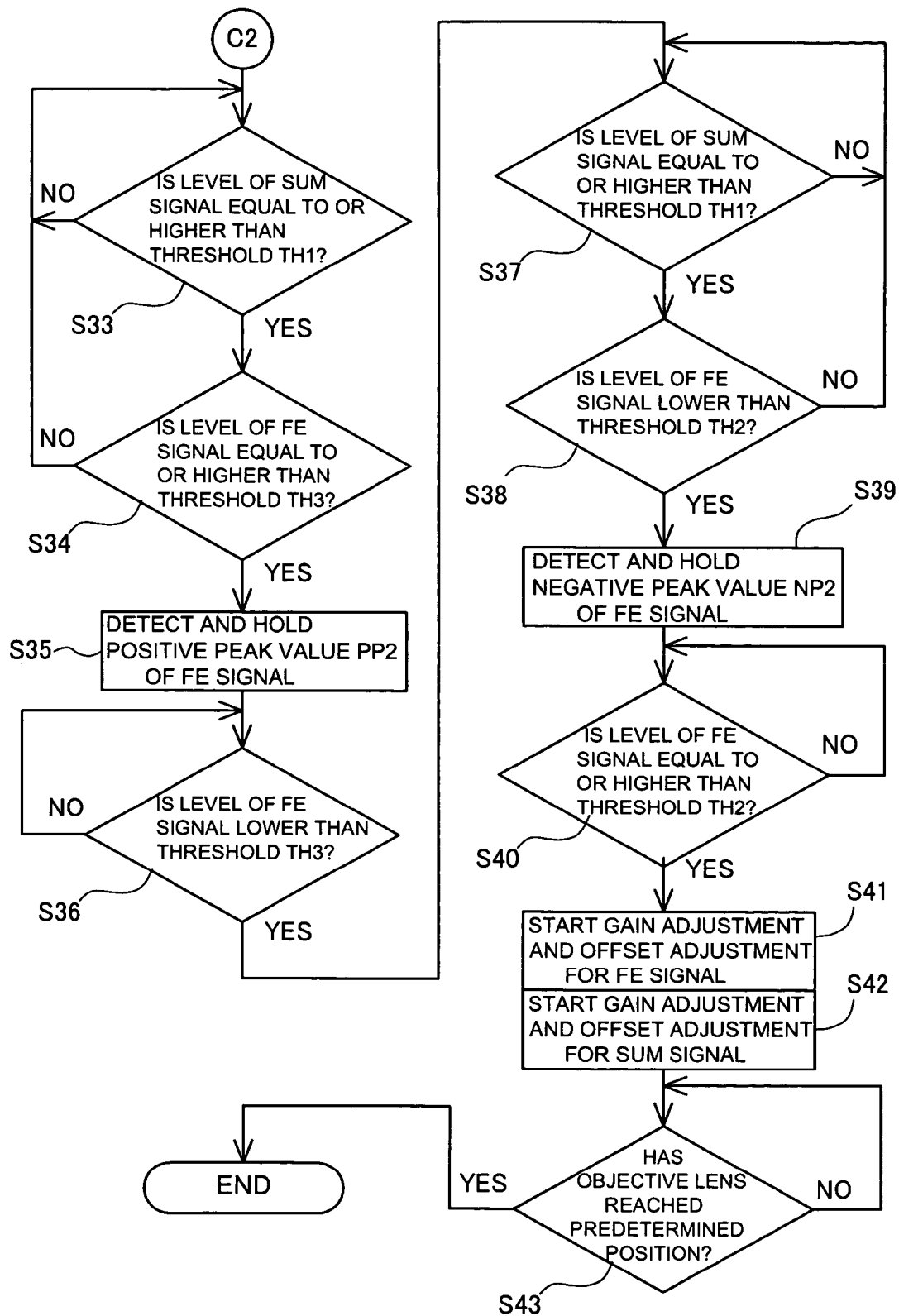
FIG. 14 is a flow chart showing a procedure of the initial adjustment process of the second embodiment.

The initial adjustment process of a second embodiment will be described. FIG. 12 is a timing chart showing a variety of signal waveforms which are generated when the initial adjustment process of this embodiment is executed. FIGS. 13 and 14 are flow charts showing a procedure of the initial adjustment process. The flow charts of FIGS. 13 and 14 are connected through a connector C2.

In the initial adjustment process of this embodiment, the processing at steps S1 to S15 (see FIGS. 10 and 11) are executed in a manner similar to the process in the first embodiment described above. At step S15, the timing controller 46 detects, based on the comparison signal CMP3 that the level of the focus error signal FE has decreased below the threshold TH3, and therefore the level of the focus error signal FE has changed by the predetermined range or more.

At step S30 after step S15, the timing controller 46 forces the timer 40 to start a measuring operation simultaneously with the detection of a falling edge of the comparison signal CMP3. Next, the timing controller 46 determines whether or not a predetermined time period has elapsed from the time of the falling edge based on the count signal Ts supplied from the timer 40 (step S31). Upon determining that the predetermined time period has elapsed, the up/down control signal UD is switched from high level to low level, causing the drive signal generator 35 to output the lens-down waveform ST (step S32). As a result, the actuator 14 changes the direction in which the objective lens 13 is driven from the direction toward the optical disc 4 to the direction away from the optical disc 4 using the lens-down waveform ST supplied from the drive signal generator 35 through the loop switch 33.

Afterwards, the timing controller 46 determines whether or not the level of the sum signal FS is equal to or higher than the threshold TH1 based on the comparison signal CMP1 (step S33), and upon determining that the level is equal to or higher than the threshold TH1, again determines whether or not the level of the focus error signal FE is equal to or higher than the threshold TH3 based on the comparison signal CMP3 supplied from the third level comparator 43 (step S34). Upon determining that the level of the focus error signal FE is lower than the threshold TH3, a control is conducted to return the procedure to the aforementioned step S33. When the level of the focus error signal FE increases to the threshold TH3 or higher after the objective lens 13 has passed the focal point, the third level comparator 43 outputs the comparison signal CMP3 at high level, causing the timing controller 46 to determine that the level of the focus error signal FE has increased to the threshold TH3 or higher, followed by proceeding to step S35.

At next step S35, the positive peak detector 50 of the waveform adjuster 31 detects a second peak value PP2 of the focus error signal FE in a manner similar to the process at step S14 (see FIG. 13), and outputs the detected second positive peak value PP2 to the gain adjuster 53 and offset adjuster 52.

Afterwards, the timing controller 46 determines whether or not the level of the focus error signal FE is lower than the threshold TH3 based on the comparison signal CMP3 (step S36), and upon determining that the level is lower than the threshold TH3, proceeds to step S37. Specifically, after the second positive peak value PP2 has detected, the level of the focus error signal FE again decreases below the threshold TH3, causing the level of the comparison signal CMP3 to change from high level to low level, so that the timing controller 46 determines that the level of the focus error signal FE is lower than the threshold TH3 by detecting a falling edge of the comparison signal CMP3.

Next, the timing controller 46 determines whether or not the level of the sum signal FS is equal to or higher than the threshold TH1 based on the comparison signal CMP1 (step S37), and upon determining that the level is equal to or higher than the threshold TH1, again determines whether or not the level of the focus error signal FE is lower than the threshold TH2 based on the comparison signal CMP2 (step S38). Upon determining that the level of the focus error signal FE is equal to or higher than the threshold TH2, a control is conducted to return the procedure to the aforementioned step S37. Specifically, since the level of the focus error signal FE decreases below the threshold TH2 after the objective lens 13 has passed again the focal position, the timing controller 46 determines that the level of the focus error signal FE is lower than the threshold TH2 by detecting a falling edge of the comparison signal CMP2, followed by proceeding to step S39.

At next step S39, the negative peak detector 51 of the waveform adjuster 31 detects a second negative peak value NP2 of the focus error signal FE, and outputs the detected second negative peak value NP2 to the offset adjuster 52 and gain adjuster 53. For preventing the negative peak detector 51 from erroneously detecting the negative peak value NP2, the timing controller 46 preferably monitors the level of the comparison signal CMP1 in parallel with the process at step S39 to abort the detection of the negative peak value NP2 if the comparison signal CMP1 changes to low level, and returns the procedure to step S37.

Afterwards, the timing controller 46 determines whether or not the level of the focus error signal FE is equal to or higher than the threshold TH2 based on the comparison signal CMP2

(step S40), and advances the procedure to steps S41 and S42 when the level is equal to or higher than the threshold TH2. Specifically, when the level of the focus error signal FE increases after it has reached the negative peak value NP2, and the comparison signal CMP2 has changed from low level to high level, the timing controller 46 detects a rising edge of the comparison signal CMP2, and advances the procedure to steps S41 and S42.

Subsequently, a gain adjustment and an offset adjustment are started for the focus error signal FE (step S41), and a gain adjustment and an offset adjustment are started for the sum signal FS (step S42). At step S41, the offset calculator 54 of the offset adjuster 52 (see FIG. 5) averages an offset value calculated from a first set of the positive peak value PP and negative peak value NP and an offset value calculated from a second set of the positive peak value PP2 and negative peak value NP2, and supplies the adder 55 with the resulting average value as an offset value OC. Also, at step S42, a gain coefficient calculated from the first set of the positive peak value PP and negative peak value NP is averaged with a gain coefficient calculated from the second set of the positive peak value PP2 and negative peak value NP2, and the resulting average value is supplied to the multiplier 58 as a gain coefficient GC.

Afterwards, the timing controller 46 determines whether or not the objective lens has reached a predetermined position (step S43), and switches the initial adjustment signal PA from high level to low level upon determining that the objective lens 13 has reached the predetermined position, followed by termination of the initial adjustment process.

In this way, in the initial adjustment process of the second embodiment, since an inverted sigmoidal waveform appears after the driving direction of the objective lens 13 has been changed to the direction away from the optical disc 4 at step S32, this waveform is effectively utilized to detect the second set of the positive peak value PP2 and negative peak value NP2 for calculation of the offset value and gain coefficient. It is therefore possible to more accurately calculate the parameters for providing the proper focus error signal FE and sum signal FS, thereby increasing the accuracy of the initial adjustments.

3. Third Embodiment

Figure 15:
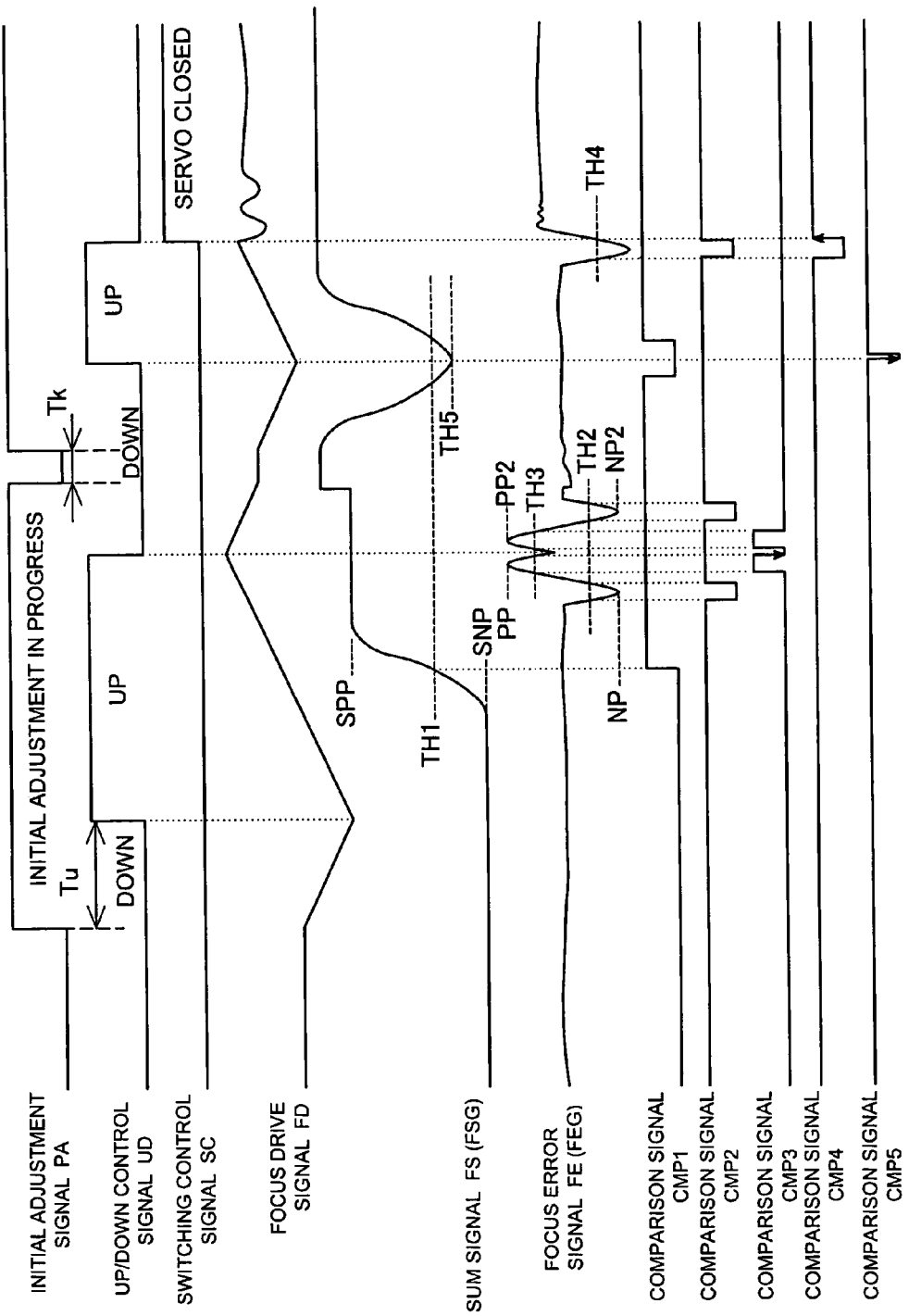
FIG. 15 is a timing chart showing a variety of signal waveforms which are generated when the initial adjustment process is performed in accordance with a third embodiment.
Figure 16:
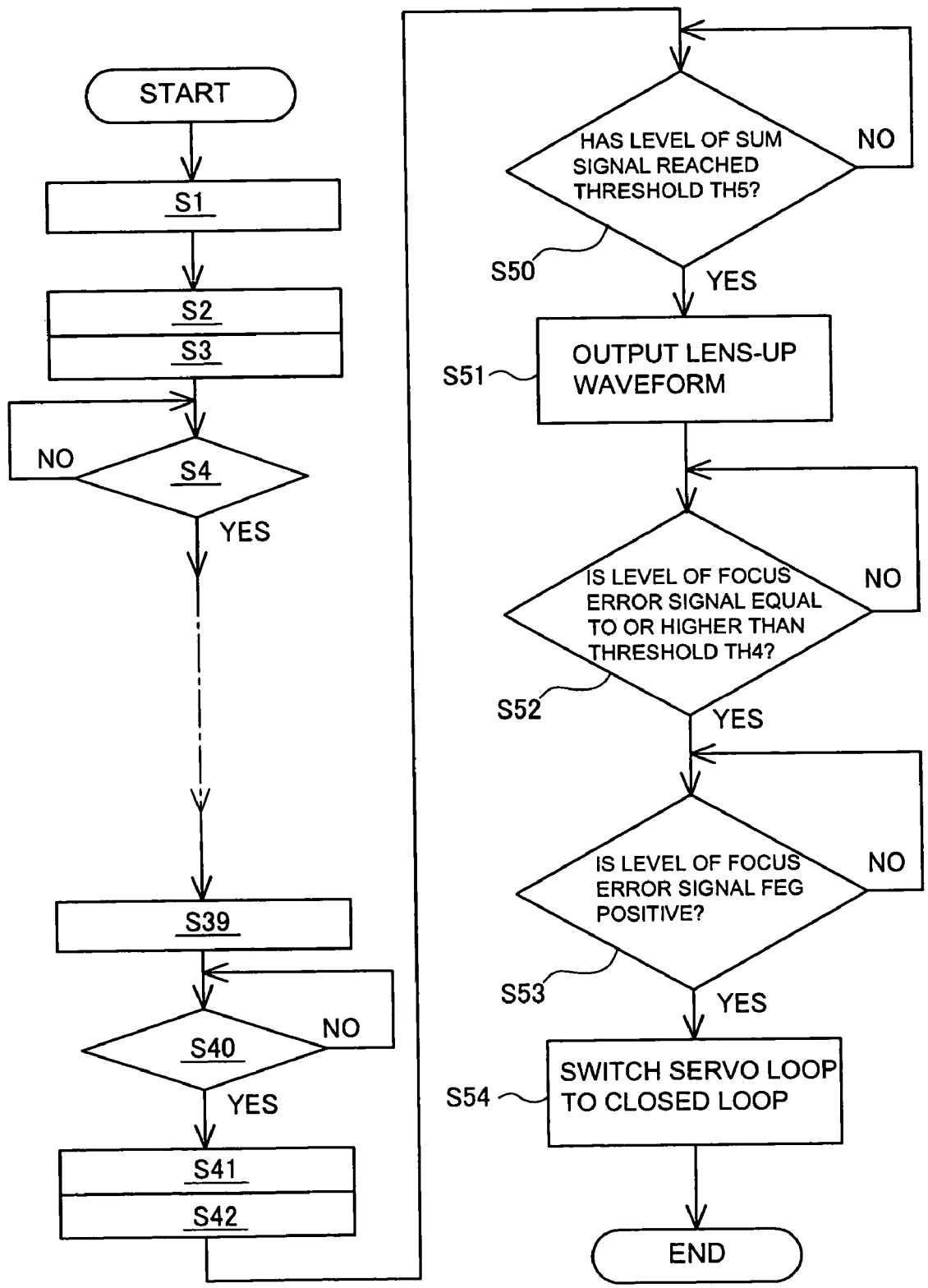
FIG. 16 is a flow chart showing a procedure of the initial adjustment process of the third embodiment.

The initial adjustment process of a third embodiment will be described. FIG. 15 is a timing chart showing a variety of signal waveforms which are generated when the initial adjustment process of this embodiment is executed. FIG. 16 is a flow chart showing a procedure of the initial adjustment process.

In the initial adjustment process of this embodiment, the process at steps S1 to S42 (see FIGS. 13 and 14) is executed in a manner similar to the process in the aforementioned second embodiment. After steps S41 and S42, gain adjustments and offset adjustments are made for the focus error signal FE and sum signal FS. Here, though not shown in the flow chart of FIG. 16, the timing controller 46 maintains the initial adjustment signal PA at low level during a period Tk which is required to stabilize the gain adjustment and offset adjustment, using the timer 40, and again switches the initial adjustment signal PA to high level after the period Tk has elapsed, as shown in FIG. 15.

For convenience of description, the timing chart of FIG. 15 shows that the focus error signal FE before the waveform adjustment prior to step S42 appears to be continuous with the focus error signal FEG after the waveform adjustment from step S42 onward, however, the focus error signal FE is actually different from the focus error signal FEG. Similarly, the sum signal FS before the waveform adjustment is shown to appear to be continuous with the sum signal FSG after the waveform adjustment.

Next, at step S50, the timing controller 46 determines whether or not the level of the waveform-shaped sum signal FSG has reached a threshold TH5 based on a comparison signal CMP5. When the level has reached the threshold TH5, the timing controller 46 advances the procedure to the next step S51, determining that the level has changed by a predetermined range or more. Specifically, after the aforementioned steps S43 and S44, the timing generator 34 (see FIG. 4) is supplied with the waveform-adjusted focus error signal FEG and sum signal FSG from the waveform adjusters 31, 37 (see FIGS. 5 and 6), respectively. The objective lens 13 continues to move down, and the waveform-shaped sum signal FSG also decreases in level as the objective lens 13 moves further away from the focal position. The fifth level comparator 45 of the timing generator 34 outputs the comparison signal CMP5 at low level when the level of the sum signal FSG is lower than the threshold TH5, so that the timing controller 46 determines that the level of the sum signal FSG has reached the threshold TH5 by detecting a falling edge of the comparison signal CMP5.

At next step S51, the timing controller 46 switches the up/down control signal UP from low level to high level simultaneously with the detection of the falling edge of the comparison signal CMP5, to output the lens-up waveform ST to the drive signal generator 35. The actuator 14 drives the objective lens 13 in the direction toward the optical disc 4 using the lens-up waveform ST supplied from the drive signal generator 35 through the loop switch 33.

Afterwards, the timing controller 46 determines whether or not the level of the focus error signal FEG is equal to or higher than the threshold TH4 based on a comparison signal CMP4 supplied from the fourth comparator 44 (step S52). Upon determining that the level is lower than the threshold TH4, the timing controller 46 advances the procedure to next step S53, determining that the level has changed by the predetermined range or more. Specifically, a sigmoidal waveform in focus appears in the focus error signal FEG as the objective lens 13 moves closer to the focal position. The level of the focus error signal FEG once decreases below the threshold TH4, and again increases across the threshold TH4. In this event, since the comparison signal CMP4 changes from low level to high level, the timing controller 46 determines that the level of the focus error signal FEG is equal to or higher than the threshold TH4 by detecting a rising edge of the comparison signal CMP4.

Subsequently, the timing controller 46 confirms whether or not the level of the focus error signal FEG is positive (step S53), and controls the servo loop to close when it confirms that the level of the focus error signal FEG is positive (step S54). Specifically, when the timing controller 46 confirms that the level of the focus error signal FEG is positive, the timing controller 46 switches the switching control signal SC from low level to high level to change from the drive signal generator 35 to the phase compensator 32 to which the loop switch 33 is connected. From this point onward, the loop switch 33 supplies the actuator 14 with the phase-adjusted focus error signal FEG applied from the phase compensator 32 as the focus drive signal FD, thereby forming a focus servo loop (closed loop).

Then, the timing controller 46 switches the up/down control signal UD from high level to low level simultaneously with the switching of the servo loop into a closed loop, followed by termination of the initial adjustment process.

In this way, according to the third embodiment, it is possible to prevent the objective lens 13 from colliding with the optical disc 4, reduce a time required for the initial adjustment process, and prevent the objective lens 13 from colliding with the optical disc 4 when there is an extremely short work distance therebetween, as is the case with the initial adjustment processes in the first and second embodiments.

Also, after the gain adjustment and offset adjustment are started for the focus error signal FE and sum signal FS at the aforementioned steps S41 and S42, the driving direction of the objective lens 13 is changed to place the objective lens near the focal position after the objective lens 13 has reached a position spaced away to some degree from the optical disc 4, and the servo loop is switched to a closed loop. Thus, the focus servo can be closed in a short time.

Further, after the gain adjustment and offset adjustment have started, the driving direction of the objective lens 13 is changed based on a change in level of the waveform-adjusted sum signal FSG, and the servo loop is switched to a closed loop based on a change in level of the waveform-adjusted focus error signal FEG, thereby making it possible to extremely reduce a time period which elapses from the start of the gain adjustment and offset adjustment to the start of the focus servo, and to reduce a time required until the focus servo becomes stable.

4. Fourth Embodiment

Figure 17:
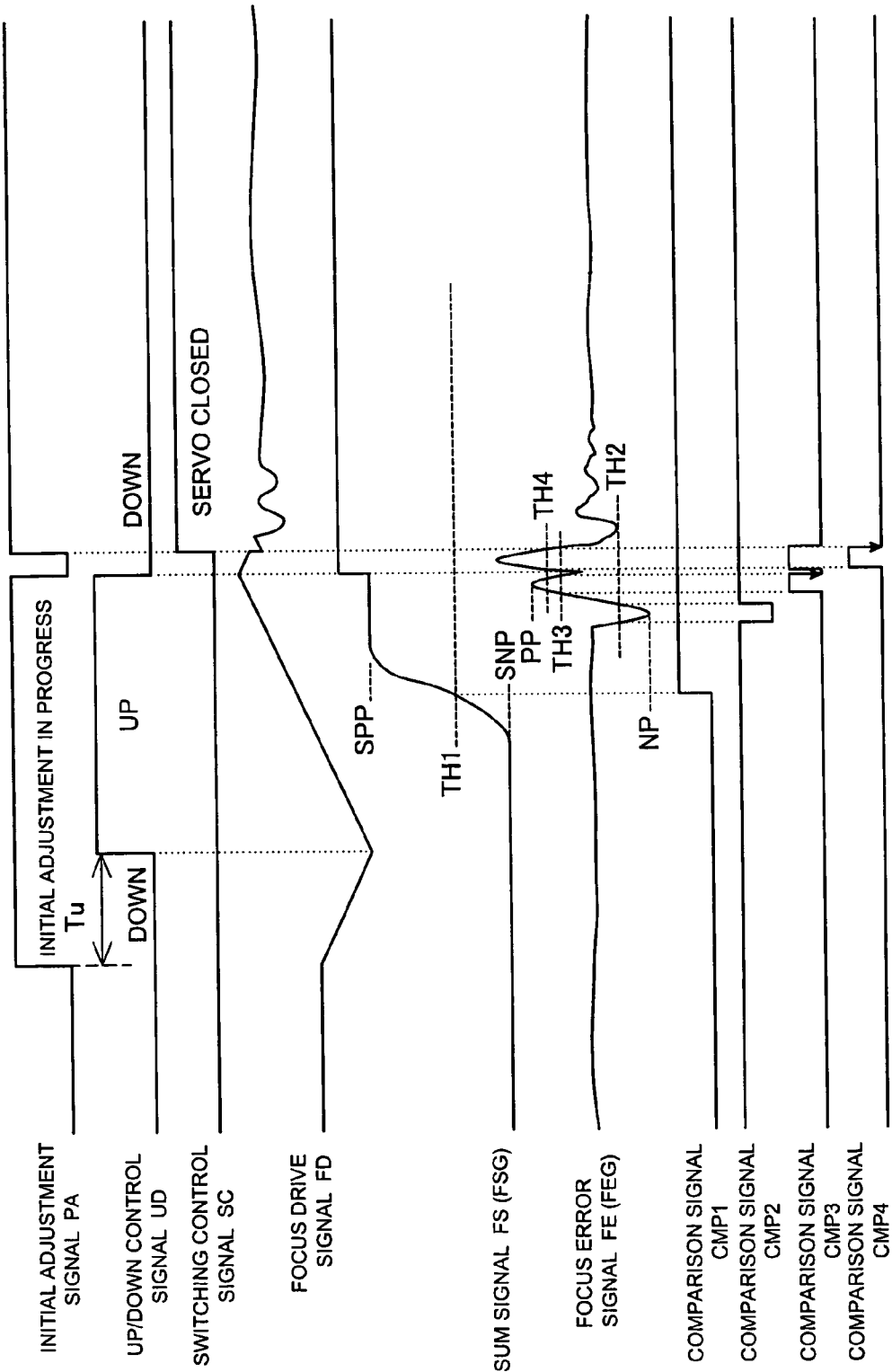
FIG. 17 is a timing chart showing a variety of signal waveforms which are generated when the initial adjustment process is performed in accordance with a fourth embodiment.
Figure 18:
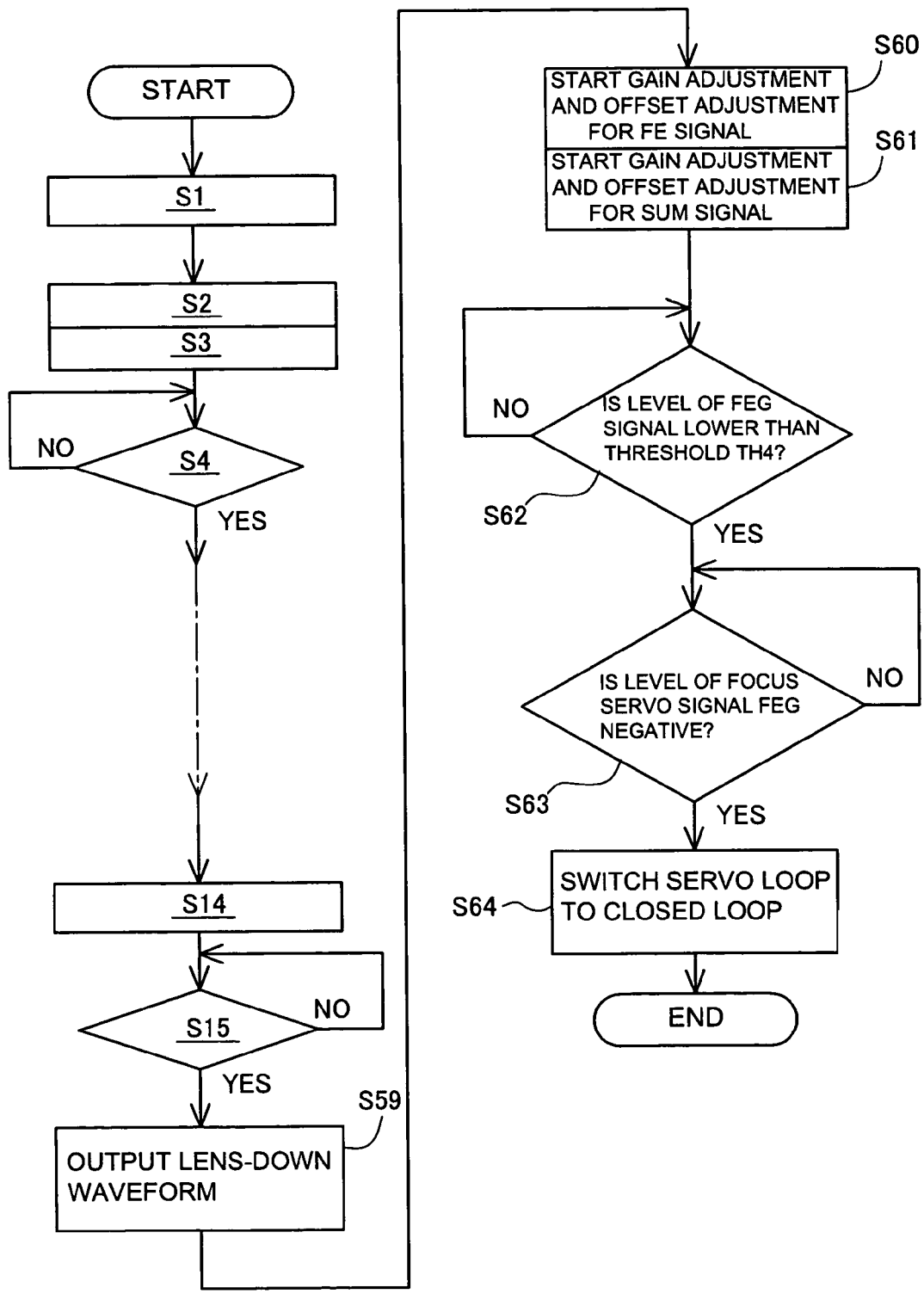
FIG. 18 is a flow chart showing a procedure of the initial adjustment process of the fourth embodiment.

The initial adjustment process of a fourth embodiment will be described. FIG. 17 is a timing chart showing a variety of waveforms which are generated when the initial adjustment process is executed in accordance with this embodiment. FIG. 18 is a flow chart showing a procedure of the initial adjustment process.

In the initial adjustment process of this embodiment, the process at steps S1 to S15 (see FIG. 11) is executed in a manner similar to the process in the aforementioned first embodiment. After confirming at step S15 that the level of the focus error signal FE has decreased below the threshold TH3 based on the comparison signal CMP3, the up/down control signal UD is switched from high level to low level to generate the lens-down waveform. As a result, the objective lens 13 is moved in the direction away from the optical disc 4 after the positive peak value PP and negative peak value NP are detected from the first sigmoidal focusing waveform of the focus error signal FE.

At next step S60, a gain adjustment and an offset adjustment are started for the focus error signal FE, and at step S61, a gain adjustment and an offset adjustment are started for the sum signal FS. For convenience of description, the timing chart of FIG. 17 shows that the focus error signal FE before the waveform adjustment prior to step S60 appears to be continuous with the focus error signal FEG after the waveform adjustment from step S60 onward, however, the focus error signal FE is actually different from the focus error signal FEG. Similarly, the sum signal FS before the waveform adjustment is shown to appear to be continuous with the sum signal FSG after the waveform adjustment.

Next, the timing controller 46 determines whether or not the level of the waveform-adjusted focus error signal FEG is lower than the threshold TH4 (step S62). When the level is lower than the threshold TH4, the timing controller 46 advances the process to step S63. Specifically, after the up/down control signal UD is switched from high level to low level, an inverse sigmoidal focusing waveform appears in the focus error signal FEG, and the level of the focus error signal FEG falls after it has reached a maximum point. In this event, the timing controller 64 determines that the level of the focus error signal FEG is lower than the threshold TH4 by detecting a falling edge of the comparison signal CMP4, and confirms the apparition of the inverse sigmoidal focusing waveform.

Subsequently, the timing controller 46 confirms whether or not the level of the focus error signal FEG is negative (step S63), and controls the servo loop to close, in a manner similar to the process at the aforementioned step S54, when it confirms that the level of the focus error signal FEG is negative (step S64). Thus, the initial adjustment process terminates.

As described above, in the fourth embodiment, after the detection of the negative peak value NP and positive peak value PP, the gain adjustment and offset adjustment (at steps S60 and S61) are executed while the objective lens 13 is driven in the direction away from the optical disc 4, and the focus servo is closed when the level of the waveform-shaped focus error signal FEG has changed by a predetermined range or more (at steps S62-S64). It is therefore possible to make a transition to the focus servo in an extremely short time, and to reduce a time required until the focus servo becomes stable. Moreover, even if the transition to the focus servo fails, the objective lens 13 can be prevented from colliding with the optical disc 4.

5. Fifth Embodiment

The initial adjustment process of a fifth embodiment will be described. In the first to fourth embodiments described above, the focus error signal FE is monitored for the level, such that the up/down control signal UD is switched from high level to low level, when a predetermined range change is detected in the level, to change the direction in which the objective lens 13 is driven. In this embodiment, on the other hand, the up/down control signal UD is switched from high level to low level when a predetermined range change is detected in the level of the sum signal FS.

Figure 19:
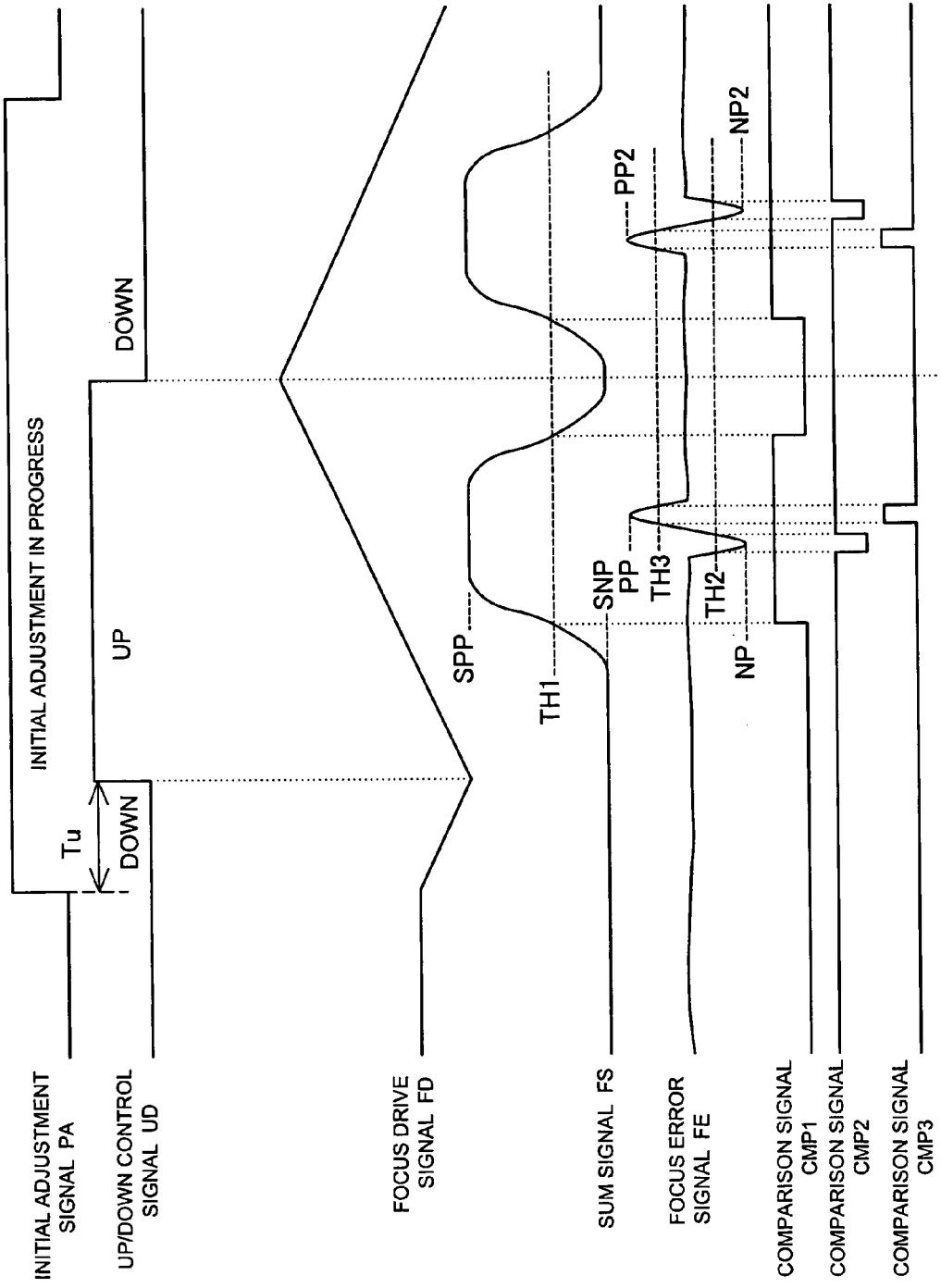
FIG. 19 is a timing chart showing a variety of signal waveforms which are generated when the initial adjustment process is performed in accordance with a fifth embodiment.
Figure 20:
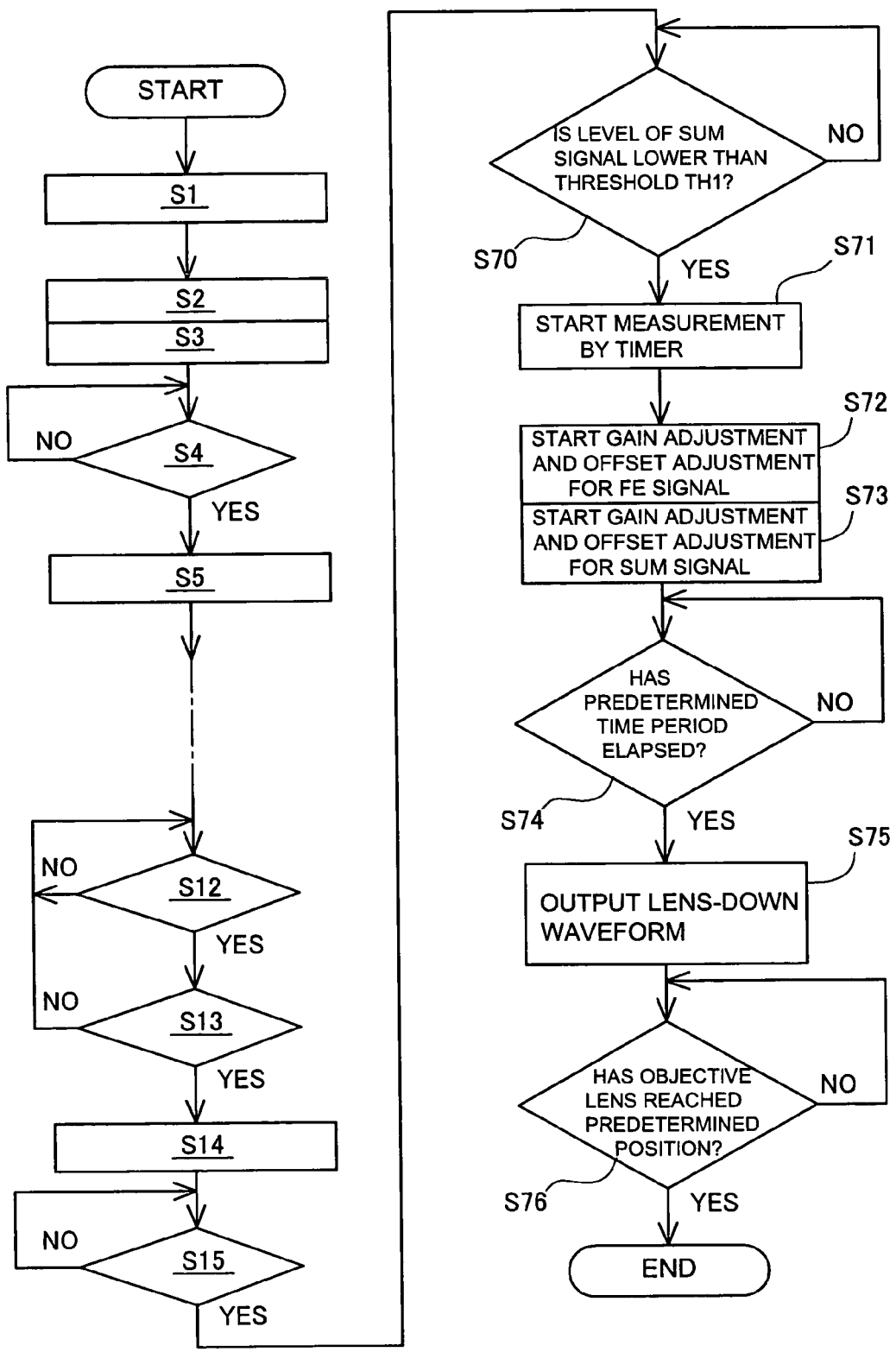
FIG. 20 is a flow chart showing a procedure of the initial adjustment process of the fifth embodiment.

FIG. 19 is a timing chart showing a variety of signal waveforms which are generated when the initial adjustment process is executed in accordance with this embodiment. FIG. 20 is a flow chart showing a procedure of the initial adjustment process.

In the initial adjustment process of this embodiment, the process at steps S1-S15 (see FIGS. 10 and 11) is executed in a manner similar to the process in the aforementioned first embodiment. At step S15, the timing controller 46 confirms that the level of the focus error signal FE has decreased below the threshold TH3 based on the comparison signal CMP3.

At step S70 after step S15, the timing controller 46 determines whether or not the level of the sum signal FS is lower than the threshold TH1 based on the comparison signal CMP1. When the level is lower than the threshold TH1, the timing controller 46 advances the process to step S71, determining that the level has changed by a predetermined range or more, to start a measuring operation of the timer 40. Specifically, since the level of the sum signal FS also decreases as the objective lens 13 moves in the direction toward the optical disc 4 and further away from the focal position, the timing controller 46 determines that the level of the comparison signal CMP1 has decreased below the threshold TH1 by detecting a falling edge of the comparison signal CMP1.

Next, in a manner similar to the process at the aforementioned steps S17 and S18, a gain adjustment and an offset adjustment are started for the focus error signal FE (step S72), and a gain adjustment and an offset adjustment are started for the sum signal FS (step S73). While this embodiment executes the process at steps S72 and S73 after the process at step S71, the present invention is not limited to this sequence of processing, but the process at steps S71, S72, and S73 may be executed in parallel.

Next, the timing controller 46 determines whether or not a predetermined time period has elapsed from the time of the falling edge of the comparison signal CMP1 based on the count signal Ts (step S74). Also, upon determining that the predetermined time period has elapsed, the timing controller 46 switches the up/down control signal UD from high level to low level, thereby causing the drive signal generator 35 to output the lens-down waveform ST (step S75). The actuator 14 drives the objective lens 13 in the direction away from the optical disc 4 using the lens-down waveform ST supplied from the drive signal generator 35.

Afterwards, the timing controller 46 determines whether or not the objective lens 13 has reached a predetermined position (step S76), and switches the initial adjustment signal PA from high level to low level when it determines that the objective lens 13 has reached the predetermined position, followed by termination of the initial adjustment process.

In the example shown in FIG. 19, an inverse sigmoidal focusing waveform appears again after the apparition of an sigmoidal focusing waveform of the focus error signal FE, so that the positive peak value PP2 and negative peak value NP2 may be detected from the inverse sigmoidal focusing waveform, instead of detecting the positive peak value PP and negative peak value NP from the first sigmoidal focusing waveform, for use in the calculation of the gain coefficient and offset value.

Also, in the example described above, the gain coefficient and offset value are calculated from a set of the positive peak value PP and negative peak value NP, but instead, processing similar to the second embodiment may be executed to calculate the gain coefficient and offset value from the set of the positive peak value PP and negative peak value NP and a set of the positive peak value PP2 and negative peak value NP2.

In this way, according to the fifth embodiment, when the level of the sum signal FS has changed by the predetermined range or more, the focus drive signal FD supplied to the actuator 14 is switched from the lens-up waveform to the lens-down waveform to change the driving direction of the objective lens 13 from the direction toward the information recording layer 4a to the opposite direction. It is therefore possible to prevent the objective lens 13 from colliding with the optical disc 4 through the initial adjustment process.

6. Sixth Embodiment

The initial adjustment process of a sixth embodiment will be described. A multi-layered recording film is known for improving the recording density of an optical disc, wherein a plurality of information recording layers are formed on a substrate of the optical disc at intervals of several tens of micrometers. It is also known that a higher resolution of the objective lens 13 (larger numerical aperture) and the multi-layered recording film give rise to a distortion of a light spot called spherical aberration, so that the optical pickup device 1 is equipped with an aberration correcting mechanism (not shown) for automatically correcting spherical aberration for each information recording layer. As described below, the initial adjustment process of this embodiment can implement the initial adjustments for this type of multi-layered disc.

FIG. 21 is a timing chart showing a variety of signal waveforms which appear when the initial adjustment process is executed for the optical disc 4 which has two information recording layers. The initial adjustment signal PA, up/down control signal UD, and focus drive signal FD have the waveforms identical to those of the counterparts in the first embodiment (see FIG. 9), and a processing procedure of this embodiment is also substantially the same as the processing procedure of the first embodiment (see FIGS. 10 and 11). Assume in the following that spherical aberration has been corrected for one target layer L0 of the two information recording layers, but spherical aberration has not been corrected for the other information recording layer L1.

As shown in FIG. 21, when the focus drive signal FD is switched from the lens-up waveform to the lens-down waveform near the focal point of the target layer L0, a sigmoidal focusing waveform corresponding to the information recording layer L1 appears first in the focus error signal FE, followed by the apparition of a sigmoidal focusing waveform corresponding to the target layer L0. Since the focus drive signal FD is switched to the lens-down waveform immediately after the apparition of the focusing waveform corresponding to the target layer L0, an inverse sigmoidal focusing waveform corresponding to the target layer L0 appears after the apparition of the sigmoidal focusing waveform of the target layer L0, followed by the apparition of an inverse sigmoidal focusing waveform corresponding to the information recording layer L1.

The focusing waveform of the information recording layer L1, which is more affected by the spherical aberration, has an amplitude smaller than that of the focusing waveform of the target layer L0 which is less affected by the spherical aberration. Bearing this fact in mind, the threshold TH2 is set to be equal to or higher than the negative peak value NP of the focusing waveform of the target layer L0 and lower than the negative peak value of the information recording layer L1 in this embodiment. The threshold TH3 is set at a value lower than the positive peak value PP of the focusing waveform of the target layer L0 and above the positive peak value of the information recording layer L1. By thus setting the thresholds TH2 and TH3, the initial adjustment process can be selectively executed only for the target layer L0.

7. Seventh Embodiment

Next, a seventh embodiment provides another threshold setting method for implementing initial adjustments for a multi-layered disc. The initial adjustment method of this embodiment will be described with reference to FIGS. 22 and 23.

FIG. 22 is a timing chart showing a variety of signal waveforms which appear when the initial adjustment process is executed for the optical disc 4 which has a single information recording layer. The initial adjustment signal PA, up/down control signal UD, and focus drive signal FD have the waveforms identical to those of the counterparts in the aforementioned first embodiment (see FIG. 9).

The timing controller 46 has functions of acquiring the level of the sum signal FS which varies over time, generating thresholds TH2, TH3 which vary over time using the acquired level of the sum signal FS, and setting the thresholds TH2, TH3 in registers of the second level comparator 42 and third level comparator 43, respectively. In this embodiment, the thresholds TH2, TH3 proportional to the level of the sum signal FS are generated in real time. Also, as shown in FIG. 22, the threshold TH3 forms a level distribution proportional to a level distribution of the sum signal FS, while the threshold TH2 forms a level distribution proportional to a level distribution of an inverted signal which has a level inverted from the level of the sum signal FS. Stated another way, the waveform of the threshold TH3 is similar to the waveform of the sum signal FS, while the waveform of the threshold TH2 is similar to the waveform of the inverted signal.

Next, FIG. 23 is a timing chart showing a variety of signal waveforms which appear when the initial adjustment process is executed for the optical disc 4 which has two information recording layers. As shown in FIG. 23, the threshold TH3 forms a level distribution proportional to a level distribution of the sum signal FS, while the threshold TH2 forms a level distribution proportional to a level distribution of an inverted signal which has a level inverted from the level of the sum signal FS, from which it is understood that the thresholds TH2, TH3 are effective only for a focusing waveform corresponding to the target layer L0.

As described above, in the seventh embodiment, proper thresholds can be set for a target layer irrespective of whether the optical disc 4 has a single recording layer or a multi recording layers.

While the initial adjustment methods of the first to seventh embodiments have been described, the present invention is not limited to these embodiments, but also includes a combination of two or more of the first to seventh embodiments.

It is understood that the foregoing description and accompanying drawings set forth the preferred embodiments of the invention at the present time. Various modifications, additions and alternatives will, of source, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2003-208378 which is hereby incorporated by reference.

What is claimed is:

1. An optical pickup device for irradiating an information recording layer of an optical recording medium with a light beam and detecting a reflected light beam reflected on said information recording layer, said optical pickup device comprising:
    an objective lens for focusing said light beam onto said information recording layer;
    a lens driver for moving the position of said objective lens in response to a drive signal supplied thereto;
    a photo-detector having a plurality of light receiving areas, each said light receiving area receiving said reflected light beam and generating an output signal in accordance with the received light beam;
    a signal generator for generating a single or a plurality of servo signals from the output signals of said photo-detector;
    a drive signal generator for generating a first focus drive signal for activating said lens driver to move said objective lens in a direction closer to said information recording layer, or a second focus drive signal for activating said lens driver to move said objective lens in a direction away from said information recording layer, and supplying said first focus drive signal or said second focus drive signal to said lens driver as said drive signal; and
    a controller for executing a switching process for switching the drive signal supplied to said lens driver from said first focus drive signal to said second focus drive signal when the level of said servo signal changes by a predetermined range or more during a period in which said drive signal generator supplies said first focus drive signal to said lens driver;
    wherein said signal generator includes a focus error signal generator for generating a focus error signal whose level varies in accordance with the distance between a current position of said objective lens and a focal position of said objective lens, and outputting said focus error signal as said servo signal,
    said optical pickup device further comprising:
    a first level comparator for comparing the level of said focus error signal with a first threshold set between a positive peak and negative peak of said focus error signal and closer to said positive peak than said negative peak, wherein said controller determines based on a result of the comparison by said first level comparator, whether or not a level of said focus error signal changes by said predetermined range or more in said switching process, and
    a waveform adjuster which includes a peak detector for detecting a positive peak value and a negative peak value of said focus error signal; and a calculator for calculating parameters using said positive peak value and negative peak value, for adjusting the waveform of said focus error signal during a period in which said drive signal generator supplies said first focus drive signal or said second focus drive signals to said lens driver, wherein said peak detector detects the positive peak values based on a result of the comparison by said first level comparator during a period in which the level of said focus error signal is equal to or higher than said first threshold.

2. An optical pickup device according to claim 1, wherein said controller executes said switching process after a positive peak and a negative peak are detected in said focus error signal.

3. An optical pickup device according to claim 1, wherein said calculator calculates an offset value as one of said parameters for said focus error signal using a sum of said positive peak value and said negative peak value, and calculates a gain coefficient as one of said parameters for said focus error signal using an inverse of a difference between said positive peak value and said negative peak value.

4. An optical pickup device according to claim 1, further comprising:
    a second level comparator for comparing the level of said focus error signal with a second threshold,
    wherein said threshold is set at a value between a positive peak value and a negative peak value of said focus error signal and closer to said negative peak value than said positive peak value, and said peak detector detects said negative peak value based on a result of the comparison by said second level comparator during a period in which the level of said focus error signal is lower than said second threshold.

5. An apparatus for reading data from an optical storage medium, comprising:
    an optical pickup device for irradiating an information recording layer of an optical recording medium with a light beam and detecting a reflected light beam reflected on said information recording layer, said optical pickup device including:
    an objective lens for focusing said light beam onto said information recording layer;
    a lens driver for moving the position of said objective lens in response to a drive signal supplied thereto;
    a photo-detector having a plurality of light receiving areas, each said light receiving area receiving said reflected light beam and generating an output signal in accordance with the received light beam;
    a signal generator for generating a single or a plurality of servo signals from the output signals of said photo-detector;

a drive signal generator for generating a first focus drive signal for activating said lens driver to move said objective lens in a direction closer to said information recording layer, or a second focus drive signal for activating said lens driver to move said objective lens in a direction away from said information recording layer, and supplying said first focus drive signal or said second focus drive signal to said lens driver as said drive signal; and a controller for executing a switching process for switching the drive signal supplied to said lens driver from said first focus drive signal to said second focus drive signal when the level of said servo signal changes by a predetermined range or more during a period in which said drive signal generator supplies said first focus drive signal to said lens driver; and a decoder for decoding said reproduced signal output from said optical pickup device, wherein said signal generator includes a focus error signal generator for generating a focus error signal whose level varies in accordance with the distance between current position of said objective lens and a focal position of said objective lens, and outputting said focus error signal as said servo signal, said optical pickup device further including:

a first level comparator for comparing the level of said focus error signal with a first threshold set between a positive peak and a negative peak of said focus error signal and closer to said positive peak than said negative peak, wherein said controller determines based on a result of the comparison by said first level comparator, whether or not a level of said focus error signal changes by said predetermined range or more in said switching process, and a waveform adjuster which includes a peak detector for detecting a positive peak value and a negative peak value of said focus error signal; and a calculator for calculating parameters using said positive peak value and negative peak value, for adjusting the waveform of said focus error signal during a period in which said drive signal generator supplies said first focus drive signal or said second focus drive signals to said lens driver, wherein said peak detector detects the positive peak values based on a result of the comparison by said first level comparator during a period in which the level of said focus error signal is equal to or higher than said first threshold.

* * * * *